United States Patent
Levien et al.

(10) Patent No.: US 9,788,349 B2
(45) Date of Patent: Oct. 10, 2017

(54) MULTI-MODALITY COMMUNICATION AUTO-ACTIVATION

(75) Inventors: Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/373,643

(22) Filed: Nov. 21, 2011

(65) Prior Publication Data

US 2013/0079050 A1    Mar. 28, 2013

Related U.S. Application Data

(63) Continuation-in-part of application No. 13/200,741, filed on Sep. 28, 2011, now Pat. No. 9,477,973, and a continuation-in-part of application No. 13/200,805, filed on Sep. 30, 2011, and a continuation-in-part of application No. 13/200,804, filed on Sep. 30, 2011, and a continuation-in-part of application No. 13/317,983, filed on Oct. 31, 2011, and a continuation-in-part of application No. 13/317,985,
(Continued)

(51) Int. Cl.
| | |
|---|---|
| *G06F 15/16* | (2006.01) |
| *H04W 76/02* | (2009.01) |
| *H04L 12/28* | (2006.01) |
| *H04L 29/06* | (2006.01) |
| *G10L 13/00* | (2006.01) |
| *H04L 29/08* | (2006.01) |
| *H04L 12/58* | (2006.01) |

(52) U.S. Cl.
CPC .............. *H04W 76/02* (2013.01); *G10L 13/00* (2013.01); *H04L 12/2836* (2013.01); *H04L 29/06068* (2013.01); *H04L 29/06482* (2013.01); *H04L 29/08756* (2013.01); *H04L 51/066* (2013.01)

(58) Field of Classification Search
CPC ....... G10L 13/00; G10L 21/08; H04L 51/066; H04L 12/2836; H04L 29/06068; H04L 29/06482; H04L 29/08756
USPC ...... 455/414.1, 413, 417, 456.1, 404.2, 416, 455/414.4, 415, 463; 709/250
See application file for complete search history.

(56) References Cited

U.S. PATENT DOCUMENTS

| | | |
|---|---|---|
| 5,280,521 A | 1/1994 | Itoh |
| 5,710,806 A | 1/1998 | Lee |

(Continued)

OTHER PUBLICATIONS

"Apache Wave;" Wikipedia, Sep. 24, 2011, pp. 1-6; located at: http://en.wikipedia.org/wiki/Apache_Wave.

(Continued)

*Primary Examiner* — Aftab N. Khan

(57) ABSTRACT

Disclosed herein are example embodiments for multi-modality communication with auto-activation. By way of example but not limitation, user interaction with a device may be determined to correspond to a second communication modality based, at least partly, on one or more parameters relating to utilization of the device. The device may activate at least one feature that causes a communication corresponding to a first communication modality to comprise a multi-modality communication corresponding to the first communication modality and to the second communication modality.

32 Claims, 22 Drawing Sheets

Related U.S. Application Data filed on Oct. 31, 2011, and a continuation-in-part of application No. 13/317,987, filed on Oct. 31, 2011.

(56) References Cited

U.S. PATENT DOCUMENTS

| | | | |
|---|---|---|---|
| 5,724,410 A | 3/1998 | Parvulescu | |
| 6,249,808 B1 | 6/2001 | Seshadri | |
| 6,259,706 B1 | 7/2001 | Shimada | |
| 6,301,338 B1 | 10/2001 | Mäkelä et al. | |
| 6,366,651 B1 | 4/2002 | Griffith | |
| 6,504,910 B1 | 1/2003 | Engelke | |
| 6,701,162 B1 | 3/2004 | Everett | |
| 6,742,059 B1 | 5/2004 | Todd et al. | |
| 6,954,781 B2 | 10/2005 | Bhattacharya | |
| 7,076,255 B2 | 7/2006 | Parupudi et al. | |
| 7,103,349 B2 | 9/2006 | Himanen | |
| 7,133,899 B2 | 11/2006 | Rowe | |
| 7,184,786 B2 | 2/2007 | Mumick | |
| 7,359,492 B2 | 4/2008 | Myers | |
| 7,428,580 B2 | 9/2008 | Hullfish et al. | |
| 7,496,625 B1 | 2/2009 | Belcher | |
| 7,523,226 B2 * | 4/2009 | Anderson et al. | 710/15 |
| 7,551,583 B1 | 6/2009 | Gazzard | |
| 7,555,521 B1 | 6/2009 | McLaughlin | |
| 7,702,792 B2 | 4/2010 | Shaffer | |
| 7,725,116 B2 | 5/2010 | Mumick | |
| 7,733,903 B2 | 6/2010 | Bhogal | |
| 7,814,160 B2 | 10/2010 | Burtner et al. | |
| 7,912,187 B1 | 3/2011 | Mikan | |
| 7,921,158 B2 | 4/2011 | Mandalia et al. | |
| 7,983,706 B2 | 7/2011 | Wolter | |
| 8,041,025 B2 * | 10/2011 | Dolph | H04N 5/60 |
| | | | 379/388.03 |
| 8,260,332 B2 | 9/2012 | Reunamäki | |
| 8,315,361 B1 | 11/2012 | Becker et al. | |
| 8,620,265 B1 | 12/2013 | Gailloux et al. | |
| 2001/0033639 A1 | 10/2001 | Martin | |
| 2002/0046262 A1 | 4/2002 | Heilig et al. | |
| 2002/0055350 A1 | 5/2002 | Gupte et al. | |
| 2002/0077830 A1 * | 6/2002 | Suomela et al. | 704/275 |
| 2002/0169610 A1 * | 11/2002 | Luegger | 704/260 |
| 2003/0003926 A1 | 1/2003 | Peters et al. | |
| 2003/0028601 A1 | 2/2003 | Rowe | |
| 2003/0064716 A1 | 4/2003 | Gailey et al. | |
| 2003/0069997 A1 * | 4/2003 | Bravin | G06F 17/2765 |
| | | | 709/250 |
| 2003/0081739 A1 | 5/2003 | Hikishima | |
| 2003/0125952 A1 | 7/2003 | Engelke et al. | |
| 2003/0174155 A1 | 9/2003 | Weng et al. | |
| 2004/0015504 A1 | 1/2004 | Ahad et al. | |
| 2004/0015547 A1 | 1/2004 | Griffin et al. | |
| 2004/0034531 A1 | 2/2004 | Chou et al. | |
| 2004/0034690 A1 | 2/2004 | Schmitz et al. | |
| 2004/0057562 A1 | 3/2004 | Myers et al. | |
| 2004/0082317 A1 * | 4/2004 | Graefen | 455/413 |
| 2004/0117804 A1 | 6/2004 | Scahill et al. | |
| 2004/0139157 A1 | 7/2004 | Neely, III et al. | |
| 2004/0203708 A1 | 10/2004 | Khan et al. | |
| 2004/0267527 A1 | 12/2004 | Creamer et al. | |
| 2004/0268265 A1 | 12/2004 | Berger | |
| 2005/0021868 A1 | 1/2005 | Sharma et al. | |
| 2005/0049879 A1 | 3/2005 | Audu et al. | |
| 2005/0135595 A1 | 6/2005 | Bushey et al. | |
| 2005/0136955 A1 | 6/2005 | Mumick et al. | |
| 2005/0198096 A1 | 9/2005 | Shaffer et al. | |
| 2005/0250550 A1 | 11/2005 | Fields | |
| 2005/0255837 A1 * | 11/2005 | Kwon | 455/414.4 |
| 2006/0052127 A1 | 3/2006 | Wolter | |
| 2006/0066717 A1 | 3/2006 | Miceli | |
| 2006/0104293 A1 | 5/2006 | Kopp et al. | |
| 2006/0159099 A1 | 7/2006 | Hensley | |
| 2006/0168095 A1 | 7/2006 | Sharma et al. | |
| 2006/0189333 A1 | 8/2006 | Othmer | |
| 2006/0217159 A1 * | 9/2006 | Watson | H04M 1/72522 |
| | | | 455/563 |
| 2006/0224623 A1 | 10/2006 | Graziadio et al. | |
| 2006/0293888 A1 | 12/2006 | Jindal | |
| 2007/0005366 A1 | 1/2007 | Sravanapudi et al. | |
| 2007/0082686 A1 | 4/2007 | Mumick et al. | |
| 2007/0130399 A1 | 6/2007 | Anderson et al. | |
| 2007/0190944 A1 | 8/2007 | Doan et al. | |
| 2007/0192418 A1 | 8/2007 | Adams et al. | |
| 2007/0203987 A1 | 8/2007 | Amis | |
| 2007/0238474 A1 | 10/2007 | Ballas et al. | |
| 2007/0260984 A1 | 11/2007 | Marks et al. | |
| 2008/0043733 A1 | 2/2008 | Liebermann | |
| 2008/0057925 A1 | 3/2008 | Ansari | |
| 2008/0068671 A1 | 3/2008 | Yoshida et al. | |
| 2008/0095332 A1 * | 4/2008 | Myers | H04M 1/274516 |
| | | | 379/88.14 |
| 2008/0119137 A1 | 5/2008 | Lee | |
| 2008/0148154 A1 | 6/2008 | Burrell et al. | |
| 2008/0192736 A1 | 8/2008 | Jabri et al. | |
| 2008/0232248 A1 | 9/2008 | Barave et al. | |
| 2008/0248818 A1 | 10/2008 | Venkatesulu et al. | |
| 2009/0028306 A1 | 1/2009 | Rhie | |
| 2009/0037170 A1 | 2/2009 | Williams | |
| 2009/0135741 A1 | 5/2009 | Mykhalchuck et al. | |
| 2009/0150574 A1 * | 6/2009 | Kawahara et al. | 710/18 |
| 2009/0171669 A1 | 7/2009 | Engelsma et al. | |
| 2009/0186636 A1 | 7/2009 | Salonen | |
| 2009/0216840 A1 * | 8/2009 | Pajunen et al. | 709/206 |
| 2009/0238346 A1 | 9/2009 | Toutain et al. | |
| 2009/0276539 A1 | 11/2009 | Huerta et al. | |
| 2009/0279455 A1 | 11/2009 | Wang et al. | |
| 2009/0290691 A1 | 11/2009 | Salonen | |
| 2009/0319918 A1 | 12/2009 | Affronti et al. | |
| 2009/0325546 A1 * | 12/2009 | Reddy | H04B 1/3833 |
| | | | 455/414.1 |
| 2010/0011069 A1 | 1/2010 | Haruna et al. | |
| 2010/0030557 A1 | 2/2010 | Molloy et al. | |
| 2010/0053212 A1 | 3/2010 | Kang et al. | |
| 2010/0057466 A1 * | 3/2010 | Garg | H04M 1/72544 |
| | | | 704/260 |
| 2010/0100809 A1 * | 4/2010 | Thomas | H04Q 3/0062 |
| | | | 715/235 |
| 2010/0144278 A1 | 6/2010 | Van Harlingen et al. | |
| 2010/0150333 A1 * | 6/2010 | Goodman | G10L 13/00 |
| | | | 379/207.02 |
| 2010/0169096 A1 | 7/2010 | Lv et al. | |
| 2010/0190513 A1 | 7/2010 | Andreasson | |
| 2010/0191590 A1 | 7/2010 | Hakkarainen et al. | |
| 2010/0211389 A1 | 8/2010 | Marquardt | |
| 2010/0211695 A1 * | 8/2010 | Steinmetz | H04W 4/02 |
| | | | 709/242 |
| 2010/0239081 A1 | 9/2010 | Krantz et al. | |
| 2010/0251124 A1 | 9/2010 | Geppert et al. | |
| 2010/0269134 A1 | 10/2010 | Storan et al. | |
| 2010/0322395 A1 * | 12/2010 | Michaelis | G06Q 10/107 |
| | | | 379/88.14 |
| 2011/0028168 A1 | 2/2011 | Champlin et al. | |
| 2011/0038512 A1 | 2/2011 | Petrou et al. | |
| 2011/0047246 A1 | 2/2011 | Frissora et al. | |
| 2011/0081007 A1 | 4/2011 | Bar-Yoav | |
| 2011/0105087 A1 | 5/2011 | Toebes et al. | |
| 2011/0105089 A1 | 5/2011 | Ellis et al. | |
| 2011/0116610 A1 * | 5/2011 | Shaw et al. | 379/88.04 |
| 2011/0130168 A1 | 6/2011 | Vendrow et al. | |
| 2011/0170675 A1 * | 7/2011 | Mikan | H04L 12/5815 |
| | | | 379/88.14 |
| 2011/0177800 A1 * | 7/2011 | Gilson | 455/417 |
| 2011/0179180 A1 * | 7/2011 | Schleifer | H04L 12/1818 |
| | | | 709/227 |
| 2011/0211679 A1 | 9/2011 | Mezhibovsky et al. | |
| 2011/0212737 A1 | 9/2011 | Isidore | |
| 2011/0270613 A1 * | 11/2011 | Da Palma | G10L 15/22 |
| | | | 704/260 |
| 2011/0294525 A1 | 12/2011 | Jonsson | |
| 2012/0034904 A1 * | 2/2012 | LeBeau | G10L 15/265 |
| | | | 455/414.1 |
| 2012/0035931 A1 | 2/2012 | Lebeau et al. | |
| 2012/0064924 A1 | 3/2012 | Schapsis et al. | |
| 2012/0077526 A1 | 3/2012 | Riffe | |

(56) References Cited

U.S. PATENT DOCUMENTS

| | | |
|---|---|---|
| 2012/0096095 A1 | 4/2012 | Bhargava |
| 2012/0115501 A1 | 5/2012 | Zheng |
| 2012/0237009 A1* | 9/2012 | Szpilfogel ............. H04M 3/493 379/88.13 |
| 2012/0259633 A1 | 10/2012 | Aihara et al. |
| 2013/0029721 A1 | 1/2013 | Ma et al. |
| 2013/0040660 A1 | 2/2013 | Fisher et al. |
| 2013/0079061 A1 | 3/2013 | Jadhav et al. |
| 2013/0158988 A1 | 6/2013 | Katis et al. |
| 2013/0252539 A1 | 9/2013 | Minter et al. |

OTHER PUBLICATIONS

"Telecommunications device for the deaf;" Wikipedia, Sep. 25, 2011, pp. 1-8; located at: http://en.wikipedia.org/wiki/Telecommunications_device_for_the_deaf.

"Google Wave Federation Protocol," Wikipedia, Sep. 24, 2011, pp. 1-3; located at: http://en.wikipedia.org/wiki/Google_Wave_Federation_Protocol.

"Interactive voice response," Wikipedia, Sep. 25, 2011, pp. 1-8; located at: http://en.wikipedia.org/wiki/Interactive_voice_response.

Brown, D.M.; "How to Make a Phone Call Using Text to Speech Software;" eHow.com, pp. 1-2; located at: http://www.ehow.com/print/how_6075364_make-using-text-speech-software.html.

* cited by examiner

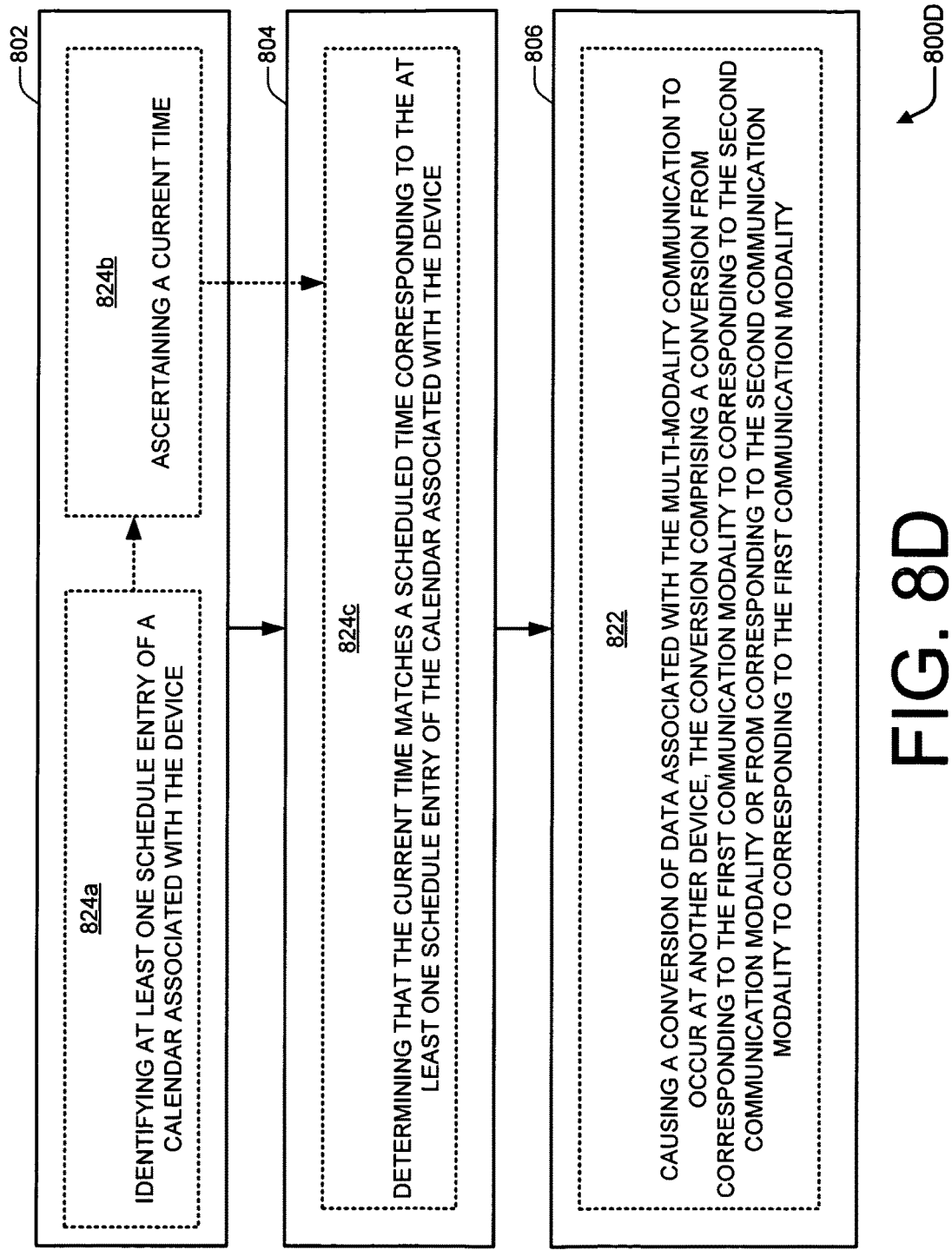

MULTI-MODALITY COMMUNICATION AUTO-ACTIVATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:

the present application constitutes a continuation-in-part of U.S. patent application Ser. No. 13/200,741, entitled "MULTI-MODALITY COMMUNICATION", naming Royce A. Levien, Richard T. Lord, Robert W. Lord, Mark A. Malamud, John D. Rinaldo Jr. as inventors, filed 28 Sep. 2011, now U.S. Pat. No. 9,477,943 which is currently co-pending, or is an application of which a currently co-pending application is entitled to the benefit of the filing date;

the present application constitutes a continuation-in-part of U.S. patent application Ser. No. 13/200,805, entitled "MULTI-MODALITY COMMUNICATION PARTICIPATION", naming Royce A. Levien, Richard T. Lord, Robert W. Lord, Mark A. Malamud, John D. Rinaldo Jr. as inventors, filed 30 Sep. 2011, which is currently co-pending, or is an application of which a currently co-pending application is entitled to the benefit of the filing date;

the present application constitutes a continuation-in-part of U.S. patent application Ser. No. 13/200,804, entitled "USER INTERFACE FOR MULTI-MODALITY COMMUNICATION", naming Royce A. Levien, Richard T. Lord, Robert W. Lord, Mark A. Malamud, John D. Rinaldo Jr. as inventors, filed 30 Sep. 2011, which is currently co-pending, or is an application of which a currently co-pending application is entitled to the benefit of the filing date;

the present application constitutes a continuation-in-part of U.S. patent application Ser. No. 13/317,985, entitled "MULTI-MODALITY COMMUNICATION WITH CONVERSION OFFLOADING", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date;

the present application constitutes a continuation-in-part of U.S. patent application Ser. No. 13/317,983, entitled "MULTI-MODALITY COMMUNICATION WITH INTERCEPTIVE CONVERSION", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date; and the present application constitutes a continuation-in-part of U.S. patent application Ser. No. 13/317,987, entitled "MULTI-MODALITY COMMUNICATION INITIATION", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BRIEF DESCRIPTION OF THE FIGURES

FIGS. 8B-8J depict example additions or alternatives for a flow diagram of FIG. 8A in accordance with certain example embodiments.

DETAILED DESCRIPTION

Figure 1:
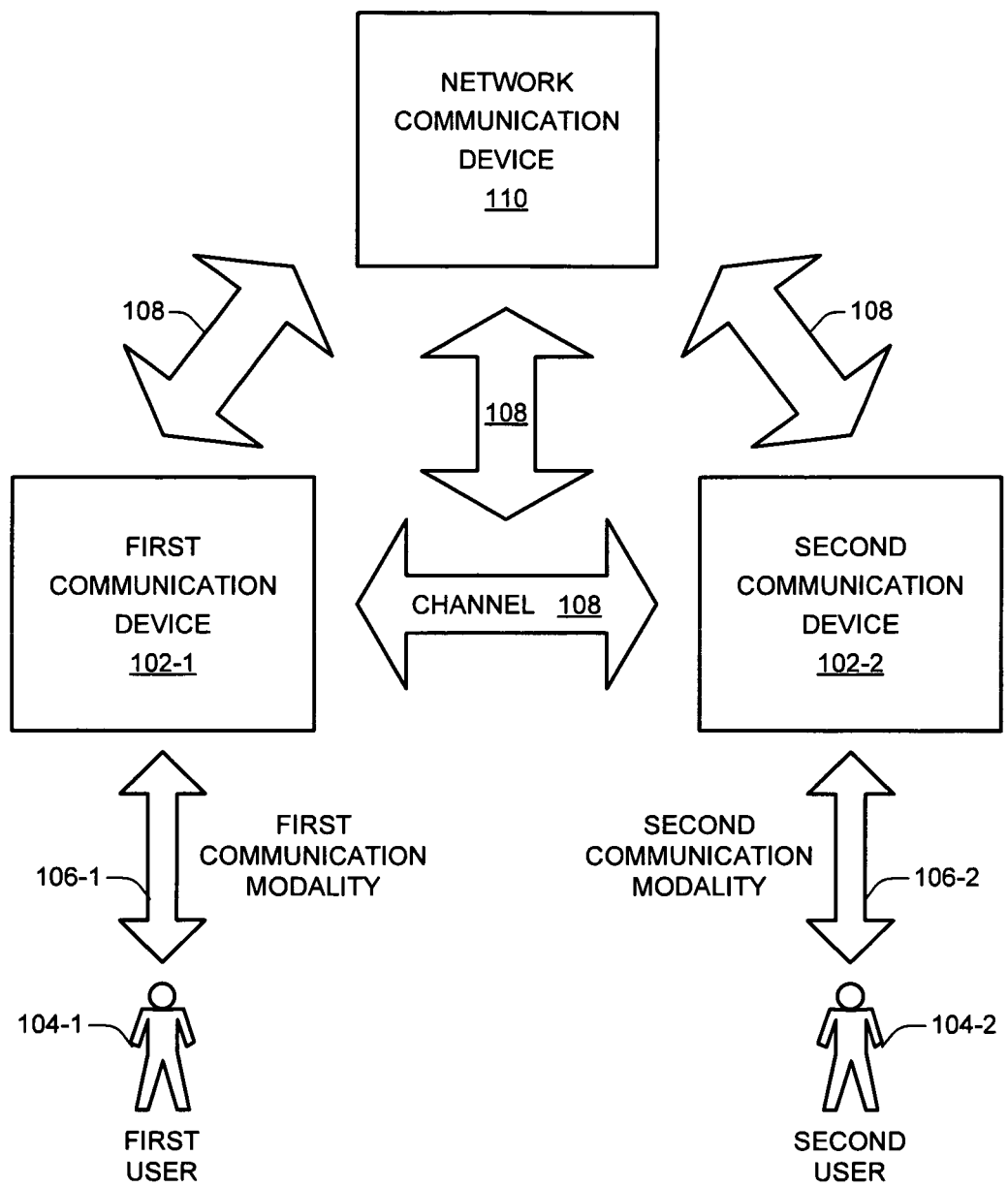
FIG. 1 is a schematic diagram of a network communication device and two communication devices that may participate in an example communication in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of a network communication device and two communication devices that may participate in an example communication in accordance with certain example embodiments. As shown in FIG. 1, by way of example but not limitation, schematic diagram 100 may include communication devices 102, users 104, communication modalities 106, at least one channel 108, or at least one network communication device 110. More specifically, schematic diagram 100 may include a first communication device 102-1, a first user 104-1, a first communication modality 106-1, a second communication device 102-2, a second user 104-2, a second communication modality 106-2, one or more channels 108, or at least one network communication device 110.

For certain example embodiments, a user 104 may be associated with at least one communication device 102. A user 104 may be interacting with a communication device 102 via at least one communication modality 106. Communication devices 102 may comprise, by way of example but not limitation, a mobile phone, a mobile terminal, a laptop or notebook computer, a personal digital assistant (PDA), a netbook, an entertainment appliance (e.g., a television, a gaming console, a set-top box, a music player, some combination thereof, etc.), a smart phone, a portable gaming device, a user equipment, a tablet or slate computer, a home phone, a desktop computer, a personal navigation device (PND), a vehicle with user-accessible communication capabilities, a private branch exchange (PBX)-based phone, videoconferencing equipment, any combination thereof, and so forth. A user 104 may comprise, by way of example only, at least one person. Example communication modalities 106 may include, by way of example but not limitation, a textual communication modality (e.g., wherein text may be communicated such as via a text message), a vocal communication modality (e.g., wherein sounds may be communicated such as via a voice call or teleconference), a visual communication modality (e.g., wherein moving images may be communicated such as via a video call or video conference), any combination thereof, and so forth.

For certain example embodiments, first user 104-1 may be associated with first communication device 102-1. First user 104-1 may be interacting with first communication device 102-1 via at least one first communication modality 106-1. Second user 104-2 may be associated with second communication device 102-2. Second user 104-2 may be interacting with second communication device 102-2 via at least one second communication modality 106-2. First communication device 102-1 or first user 104-1 may be participating in at least one communication (not explicitly shown in FIG. 1) with second communication device 102-2 or second user 104-2 via one or more channels 108. A communication may comprise, by way of example but not limitation, a transmission of data, a reception of data, an exchange of data, a flow of data (e.g., between or among two or more endpoints), any combination thereof, and so forth.

For certain example embodiments, a channel 108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a public-switched telephone network (PSTN), at least part of a cable network, at least part of a cellular network connection, at least part of an Internet connection, at least part of a Wi-Fi connection, at least part of a WiMax connection, at least part of an internet backbone, at least part of a satellite network, at least part of a fibre network, multiple instances of any of the above, any combination of the above, and so forth. A channel 108 may include one or more nodes (e.g., a telecommunication node, an access point, a base station, an internet server, a gateway, an internet or telecommunication switch, any combination thereof, etc.) through which signals are propagated. A network communication device 110 may comprise, by way of example but not limitation, at least one node through which signals are propagated for a communication that includes a first communication device 102-1 or a second communication device 102-2. A network communication device 110 may communicate with first communication device 102-1 or second communication device 102-2 using any one or more of multiple channels 108, a few examples of which are illustrated in schematic diagram 100.

For certain example implementations, a communication may be initiated by first communication device 102-1, first user 104-1, second communication device 102-2, second user 104-2, any combination thereof, and so forth. For certain example implementations, first communication modality 106-1 may comprise at least one different communication modality from second communication modality 106-2. Furthermore, for certain example implementations, first communication modality 106-1 or second communication modality 106-2 may change from one communication modality to another communication modality during a single communication, across different communications, and so forth. Additionally or alternatively, another (e.g., different) communication modality may be referred to herein as a "third communication modality" or a "fourth communication modality", for example.

Moreover, it should be understood that the terms "first" or "second" may, depending on context, be a matter of perspective. For instance, a communication device 102 or a user 104 or a communication modality 106 may be considered a first one at a given moment, for a given communication, from a given perspective, etc. but may be considered a second one at a different moment, for a different communication, from a different perspective, etc. However, one of ordinary skill in the art will recognize that the term "first" or "second" (or "third" or "fourth" etc.) may serve, depending on context, to indicate that different interactions, acts, operations, functionality, a combination thereof, etc. may be occurring at, may be more closely associated with, a combination thereof etc. one side, aspect, location, combination thereof, etc. of a particular communication as compared to another side, aspect, location, combination thereof, etc. of the particular communication. For example, one signal including data may be transmitted from a first communication device 102-1 and received at a second communication device 102-2, or another signal including data may be transmitted from a second communication device 102-2 and received at a first communication device 102-1.

Figure 2:
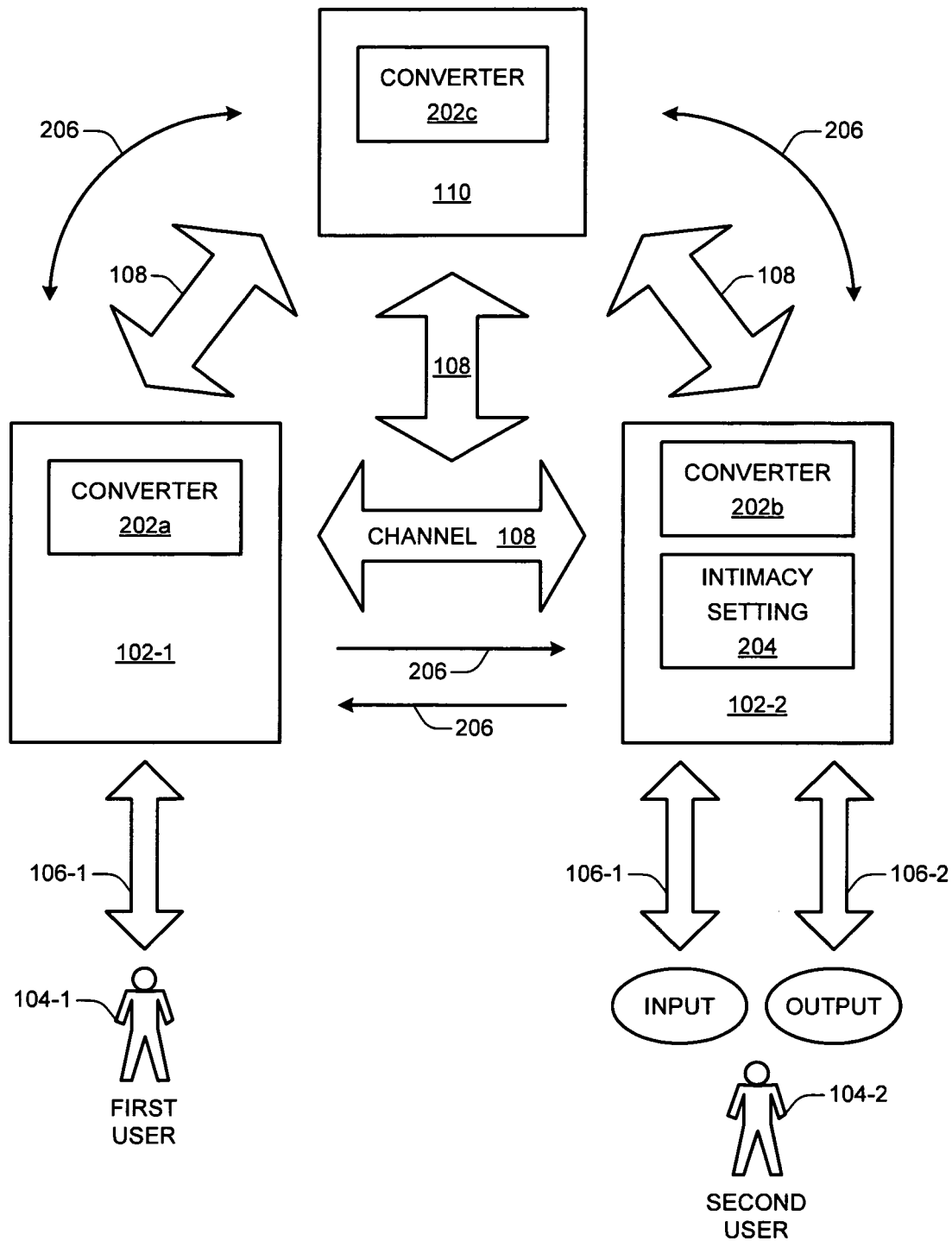
FIG. 2 is a schematic diagram of communication devices that may be involved in a communication relating to at least two communication modalities or one or more converters responsive to at least one example intimacy setting in accordance with certain example embodiments.

FIG. 2 is a schematic diagram 200 of communication devices that may be involved in a communication relating to at least two communication modalities or one or more converters responsive to at least one example intimacy setting in accordance with certain example embodiments. As shown in FIG. 2, by way of example but not limitation, schematic diagram 200 may include communication devices 102, users 104, communication modalities 106, at least one channel 108, at least one network communication device 110, or one or more signals 206. More specifically, schematic diagram 200 may include a first communication device 102-1, a first user 104-1, a first communication modality 106-1, a second communication device 102-2, a second user 104-2, a second communication modality 106-2, one or more channels 108, at least one network communication device 110, or one or more signals 206. Furthermore, one or more of first communication device 102-1, second communication device 102-2, or network communication device 110 may include at least one converter 202 (e.g., a converter 202a, a converter 202b, or a converter 202c, respectively). Additionally or alternatively, at least second communication device 102-2 may include (e.g., store, establish, have access to, a combination thereof, etc.) at least one intimacy setting 204.

For certain example embodiments, first user 104-1 may be associated with first communication device 102-1. First user 104-1 may be interacting with first communication device 102-1 via at least one first communication modality 106-1. Second user 104-2 may be associated with second communication device 102-2. Second user 104-2 may be interacting with second communication device 102-2 via at least one second communication modality 106-2. Additionally or alternatively, second user 104-2 may be interacting with second communication device 102-2 via at least one first communication modality 106-1. As described further herein below, at least one user 104 for at least one side of a communication may be engaged in a multi-modality communication by interacting with an associated communication device 102 using two or more communication modalities 106, such as a first communication modality 106-1 and a second communication modality 106-2. First communication modality 106-1 may differ from second communication modality 106-2. First communication device 102-1 or first user 104-1 may be participating in at least one communication with second communication device 102-2 or second user 104-2 via one or more signals 206, a few examples of which are shown in FIG. 2. Signals 206 may propagate via one or more channels 108. Signals 206, by way of example but not limitation, may comprise, electrical signals, magnetic signals, electromagnetic signals, photonic signals, wireless signals, wired signals, multiples ones thereof, any combination thereof, and so forth.

For certain example embodiments, a second communication device 102-2 may receive one or more signals 206 corresponding to a first communication modality 106-1. A second communication device 102-2 may respond to one or more received signals 206 corresponding to first communication modality 106-1 based at least partly on second user 104-2 interaction via a second communication modality 106-2 in accordance with at least one intimacy setting 204. By way of example but not limitation, at least one intimacy setting 204 may indicate what kind or kinds of one or more communication modalities 106 a user 104 is willing to expose for at least one communication.

For certain example embodiments, at least one intimacy setting 204 may indicate how a user 104 is to interact with a communication device 102 with respect to a given communication without condition (e.g., a user may limit any current communications to text, to voice, to video, etc.). Additionally or alternatively, at least one intimacy setting 204 may indicate how a user 104 is to interact with a communication device with respect to a given communication on a conditional basis. By way of example only, a user 104 may indicate a communication modality (e.g., as represented by at least one intimacy setting 204) in at least partial dependence on whether an associated communication device 102 initiated a communication or terminated a communication. For instance, at least one intimacy setting 204 may indicate that communications are to be initiated using an interaction in accordance with a voice communication modality, but the at least one intimacy setting 204 may indicate that communications are to be terminated (e.g., accepted, received, a combination thereof, etc.) using a textual communication modality.

As another example of a conditional intimacy setting 204, a second user 104-2 may indicate a second communication modality 106-2 in at least partial dependence on a first communication modality 106-1. For instance, at least one intimacy setting 204 may indicate that if a first communication modality 106-1 corresponds to text, a second communication modality 106-2 is also to correspond to text; furthermore, the at least one intimacy setting 204 may indicate that if a first communication modality 106-1 corresponds to voice, a second communication modality 106-2 is to correspond to text; moreover, the at least one intimacy setting 204 may indicate that if a first communication modality 106-1 corresponds to video, a second communication modality 106-2 is to correspond to voice. Additionally or alternatively, a second user 104-2 may indicate a second communication modality 106-2 that is based at least partially on: an identity of a first user 104-1; a time of day, day of week, a combination thereof, etc.; an environmental condition (e.g., an ambient lighting level, a level or type of movement—e.g. vehicle motion may be detected, a combination thereof, etc.) detectable by sensor(s) or otherwise determinable by a device; a calendar; any combination thereof; and so forth. However, claimed subject matter is not limited to any particular examples.

For certain example embodiments, a user 104 may interact with a single device (or multiple devices) for a single communication using one communication modality 106. Additionally or alternatively, a user 104 may interact with a single device (or multiple devices) for a single communication using two or more communication modalities 106. For certain example implementations, and as illustrated with respect to second communication device 102-2 in schematic diagram 200, a second user 104-2 may interact with input features of second communication device 102-2 in accordance with a first communication modality 106-1 and may interact with output features of second communication device 102-2 in accordance with a second communication modality 106-2. For instance, if first communication modality 106-1 comprises voice interaction, second communication modality 106-2 may comprise textual interaction. In such an instance, first user 104-1 may interact with first communication device 102-1 using voice (e.g., for both input and output) for a voice call initiated at first communication device 102-1, and second user 104-2 may interact with second communication device 102-2 using voice with respect to input features of second communication device 102-2 (e.g., second user 104-2 may speak into a microphone to input vocal sounds). However, with respect to output features of second communication device 102-2, second user 104-2 may interact with second communication device 102-2 using text. Second communication device 102-2 may, for example, display text on a screen (e.g., a LCD or LED screen) or a projection surface for the data that corresponds to vocal input from first user 104-1 at first communication device 102-1. To provide a textual version for display of voice input data, voice data may be converted to text data (e.g., at a converter).

For certain example embodiments, communication data (e.g., video data, voice data, text data, a combination thereof, etc.) may be converted from corresponding to one type of communication modality 106 to corresponding to another type of communication modality 106 by at least one converter 202. For certain example implementations, a converter 202 may perform a conversion of a correspondence with one communication modality 106 to a correspondence with another communication modality 106. By way of example but not limitation, a converter 202 may perform a conversion (e.g., of signals) from a correspondence with a first communication modality 106-1 to a correspondence with a second communication modality 106-2, may perform a conversion (e.g., of signals) from a correspondence with a second communication modality 106-2 to a correspondence with a first communication modality 106-1, some combination thereof, and so forth. By way of example only, a converter 202 may convert voice data to text data, text data to video data, text data to voice data, voice data to video data, any combination thereof, and so forth. A given multimodality communication may be subject to one or more conversions by one or more converters 202.

For certain example embodiments, a device may include (e.g., comprise at least a portion of, have access to, implement, realize, execute, a combination thereof, etc.) at least one converter 202. As shown in schematic diagram 200, but by way of example only, a first communication device 102-1 may include a converter 202a, a second communication device 102-2 may include a converter 202b, or a network communication device 110 may include a converter 202c. Additional or alternative implementations are described herein. One or more converters 202 may be employed in different communication path or conversion scenarios.

FIGS. 3A-3H are schematic diagrams illustrating different communication path or conversion scenarios 300A-300H for different example communications in accordance with certain example embodiments. As illustrated, each schematic diagram includes at least one conversion 302 or at least one communication path 304. By way of example but not limitation, a conversion 302 may comprise a conversion of data from corresponding to one communication modality to corresponding to another communication modality. By way of example but not limitation, a communication path 304 may comprise a path in which one or more signals (e.g., one or more signals 206) that include data (e.g., text data, voice data, video data, a combination thereof, etc.) traverse between two or more devices via one or more channels 108 (e.g., of FIGS. 1 and 2). Although not explicitly illustrated in FIGS. 3A-3H for the sake of visual clarity, a first user 104-1, a second user 104-2, a first communication modality 106-1, and a second communication modality 106-2 (e.g., each of FIGS. 1 and 2) are referred to herein below with regard to one or more of example scenarios 300A-300H.

Figure 3A:
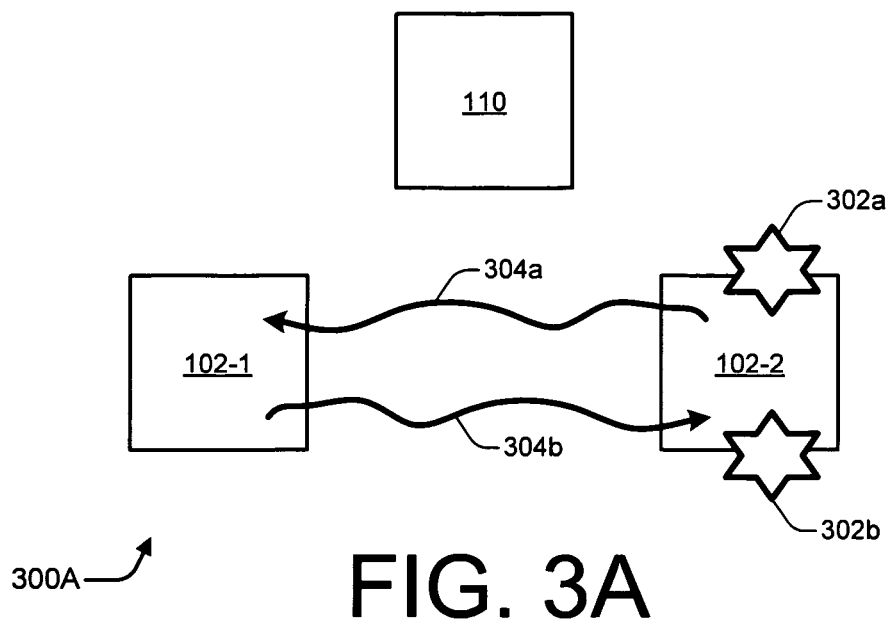
FIGS. 3A-3H are schematic diagrams illustrating different communication path or conversion scenarios for different example communications in accordance with certain example embodiments.

For certain example embodiments, with regard to example scenario 300A of FIG. 3A, a conversion 302a or a conversion 302b may be performed at a second communication device 102-2. For certain example implementations, a first user 104-1 may interact with a first communication device 102-1 in accordance with a first communication modality 106-1, or a second user 104-2 may interact with second communication device 102-2 in accordance with a second communication modality 106-2. Second user 104-2 may provide user input interaction (e.g., video, voice, text, a combination thereof, etc.) at second communication device 102-2 in accordance with second communication modality 106-2. Data corresponding to second communication modality 106-2 may be converted to data corresponding to first communication modality 106-1 via conversion 302a. Data corresponding to first communication modality 106-1 may be transmitted from second communication device 102-2 or received at first communication device. 102-1 via communication path 304a.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or second communication device 102-2 may receive data corresponding to first communication modality 106-1 via communication path 304b. At conversion 302b, data corresponding to first communication modality 106-1 may be converted to data corresponding to second communication modality 106-2. Second communication device 102-2 may present data corresponding to second communication modality 106-2 as user output to second user 104-2. By way of example only, first communication modality 106-1 may comprise voice interaction, and second communication modality 106-2 may comprise text interaction. With conversion 302a or conversion 302b, first user 104-1 may interact with first communication device 102-1 via voice, and second user 104-2 may interact with second communication device 102-2 via text.

Figure 3B:
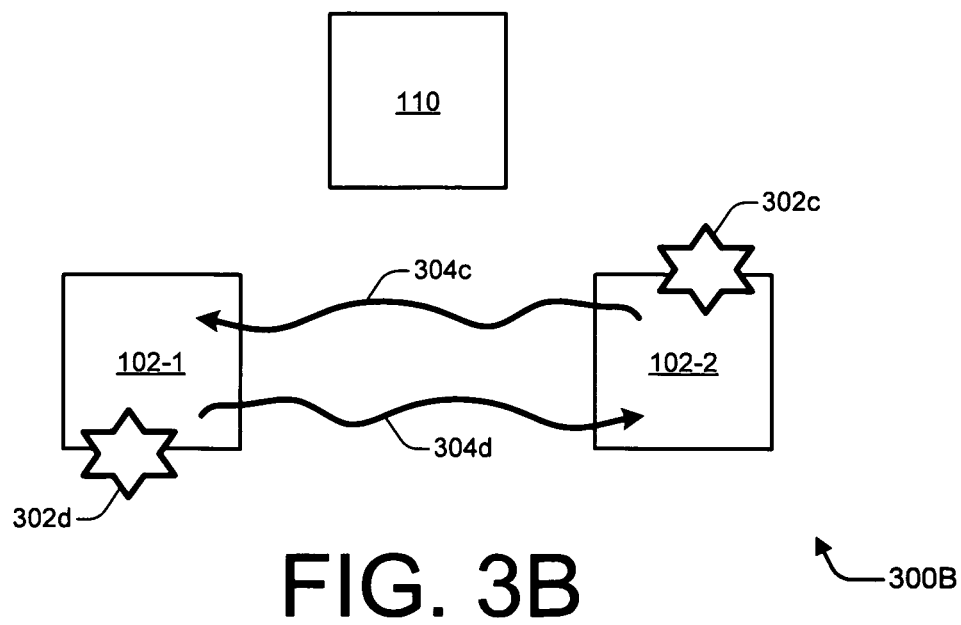

For certain example embodiments, with regard to example scenario 300B of FIG. 3B, a conversion 302c may be performed at a second communication device 102-2, or a conversion 302d may be performed at a first communication device 102-1. For certain example implementations, a first user 104-1 may interact with a first communication device 102-1 in accordance with a first communication modality 106-1, or a second user 104-2 may interact with second communication device 102-2 in accordance with a second communication modality 106-2. Second user 104-2 may provide user input interaction at second communication device 102-2 in accordance with second communication modality 106-2. Data corresponding to second communication modality 106-2 may be converted to data corresponding to first communication modality 106-1 via conversion 302c. Data corresponding to first communication modality 106-1 may be transmitted from second communication device 102-2 or received at first communication device 102-1 via communication path 304c.

For certain example implementations, first communication device 102-1 may present data corresponding to first communication modality 106-1 to first user 104-1 as user output. First communication device 102-1 may accept user input to acquire data corresponding to first communication modality 106-1. At conversion 302d, data corresponding to first communication modality 106-1 may be converted to data corresponding to second communication modality 106-2. First communication device 102-1 may transmit or second communication device 102-2 may receive data corresponding to second communication modality 106-2 via communication path 304d. Second communication device 102-2 may present data corresponding to second communication modality 106-2 as user output to second user 104-2. By way of example only, first communication modality 106-1 may comprise text interaction, and second communication modality 106-2 may comprise voice interaction. With conversion 302c or conversion 302d, first user 104-1 may interact with first communication device 102-1 via text, and second user 104-2 may interact with second communication device 102-2 via voice, with conversions 302c and 302d being performed prior to transmission on both sides of a communication or at a device that receives user input data that is to be converted. A given communication device 102 may have expertise at converting user input data from a frequent user of the given communication device 102 (e.g., by using recorded sound samples—for conversion of text to voice, vocal training samples—for converting voice to text, a combination thereof, etc.). Alternatively, conversion 302c or conversion 302d may be performed on received data after transmission on one side or on two sides of a communication.

Figure 3C:
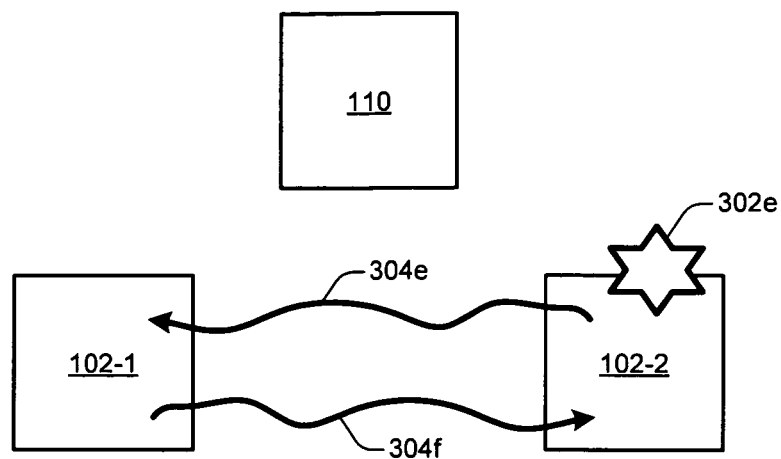

For certain example embodiments, with regard to example scenario 300C of FIG. 3C, a conversion 302e may be performed at a second communication device 102-2. For certain example implementations, a first user 104-1 may interact with a first communication device 102-1 in accordance with a first communication modality 106-1, or a second user 104-2 may interact with second communication device 102-2 in accordance with a second communication modality 106-2 for user input interaction and in accordance with first communication modality 106-1 for user output interaction. Second user 104-2 may provide user input interaction at second communication device 102-2 in accordance with second communication modality 106-2. Data corresponding to second communication modality 106-2 may be converted to data corresponding to first communication modality 106-1 via conversion 302e. Data corresponding to first communication modality 106-1 may be transmitted from second communication device 102-2 or received at first communication device 102-1 via communication path 304e.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or second communication device 102-2 may receive data corresponding to first communication modality 106-1 via communication path 304f. Second communication device 102-2 may present data corresponding to first communication modality 106-1 as user output to second user 104-2. By way of example only, first communication modality 106-1 may comprise voice interaction, and second communication modality 106-2 may comprise text interaction. With conversion 302e, first user 104-1 may interact with first communication device 102-1 via voice, and second user 104-2 may interact with second communication device 102-2 via voice for user output interaction (e.g., may listen to sounds at second communication device 102-2 as produced by first user 104-1 at first communication device 102-1) and via text for user input interaction (e.g., may type text into second communication device 102-2). Conversion 302e may convert input text data into converted voice data for transmission via communication path 304e.

Although not explicitly shown in FIGS. 3A-3C, a communication path between e.g. first communication device 102-1 and second communication device 102-2 may traverse one or more network communication devices. However, for example scenarios 300A-300C, conversions) 302 are performed at first communication device 102-1 or second communication device 102-2. In contrast, for example scenarios 300D-300F of FIGS. 3D-3F, at least one conversion 302 is performed at a network communication device 110. If a communication path 304 is "naturally" traversing a network communication device 110 (e.g., if a communication path 304 is to traverse a network communication device 110 regardless of whether a multi-modality-communication-related feature is to be facilitated by network communication device 110), then network communication device 110 may intercept communication data flowing along communication path 304. Communication data may be intercepted by a network communication device 110 on its own accord or based on its own instructions, in response to a request by a first communication device 102-1, in response to a request by a second communication device 102-2, in response to a request from a third party, in response to one or more stored settings, in response to an indication in a communication initiation or setup message, any combination thereof, and so forth. By way of example but not limitation, a network communication device 110 that comprises a telecommunication node, an internet node facilitating a voice over internet protocol (VoIP) communication, a combination thereof, etc. may be capable of intercepting a communication flow along a communication path 304 and implementing a multi-modality-communication-related-feature (e.g., a communication modality conversion) for an intercepted communication flow. Additionally or alternatively, a communication path 304 may be redirected so as to traverse a network communication device 110 that is capable of implementing a multi-modality-communication-related-feature (e.g., a communication modality conversion) for a redirected communication flow. A communication path may be redirected in response to a command by a first communication device 102-1, in response to a command by a second communication device 102-2, in response to a request from a third party, any combination thereof, and so forth.

Figure 3D:
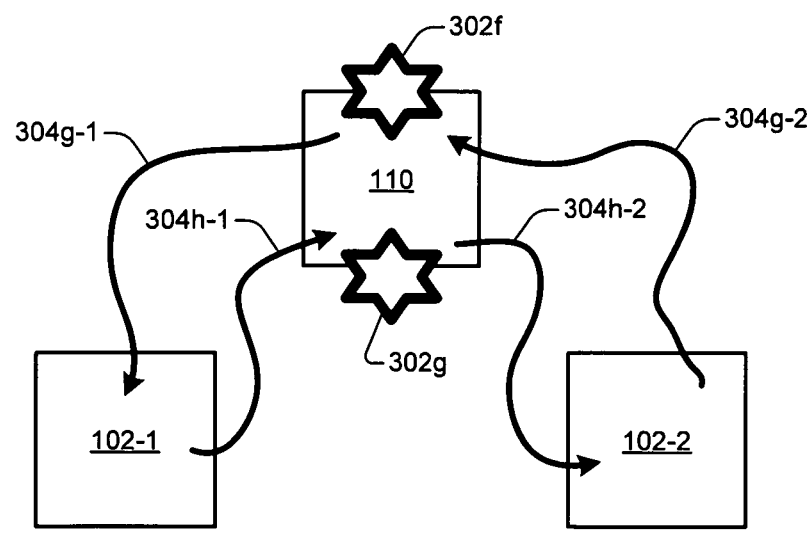

For certain example embodiments, with regard to example scenario 300D of FIG. 3D, a conversion 302f or a conversion 302g may be performed at a network communication device 110. For certain example implementations, a first user 104-1 may interact with a first communication device 102-1 in accordance with a first communication modality 106-1, or a second user 104-2 may interact with a second communication device 102-2 in accordance with a second communication modality 106-2. Second user 104-2 may provide user input interaction at second communication device 102-2 in accordance with second communication modality 106-2. Data corresponding to second communication modality 106-2 may be transmitted from second communication device 102-2 or received at network communication device 110 via communication path 304g-2. Data corresponding to second communication modality 106-2 may be converted to data corresponding to first communication modality 106-1 via conversion 302f. Data corresponding to first communication modality 106-1 may be transmitted from network communication device 110 or received at first communication device 102-1 via communication path 304g-1.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or network communication device 110 may receive data corresponding to first communication modality 106-1 via communication path 304h-1. Data corresponding to first communication modality 106-1 may be converted to data corresponding to second communication modality 106-2 via conversion 302g. Data corresponding to second communication modality 106-2 may be transmitted from network communication device 110 or received at second communication device 102-2 via communication path 304h-2. Second communication device 102-2 may present data corresponding to second communication modality 106-2 as user output to second user 104-2. By way of example only, first communication modality 106-1 may comprise video interaction, and second communication modality 106-2 may comprise voice interaction. With conversion 302f and conversion 302g at network communication device 110, first user 104-1 may interact with first communication device 102-1 via video, and second user 104-2 may interact with second communication device 102-2 via voice. It should be understood that conversion 302f may not be a reciprocal or inverse process of conversion 302g (or vice versa); additionally or alternatively, data corresponding to first communication modality 106-1 may be converted to data corresponding to a third communication modality via a conversion 302g, for example if user output interaction at second communication device 102-2 corresponds to a third communication modality. Additionally or alternatively, first communication device 102-1 or second communication device 102-2 may perform at least one conversion (e.g., a conversion 302f or 302g in lieu of two conversions being performed by network communication device 110 as shown in example scenario 300D).

Figure 3E:
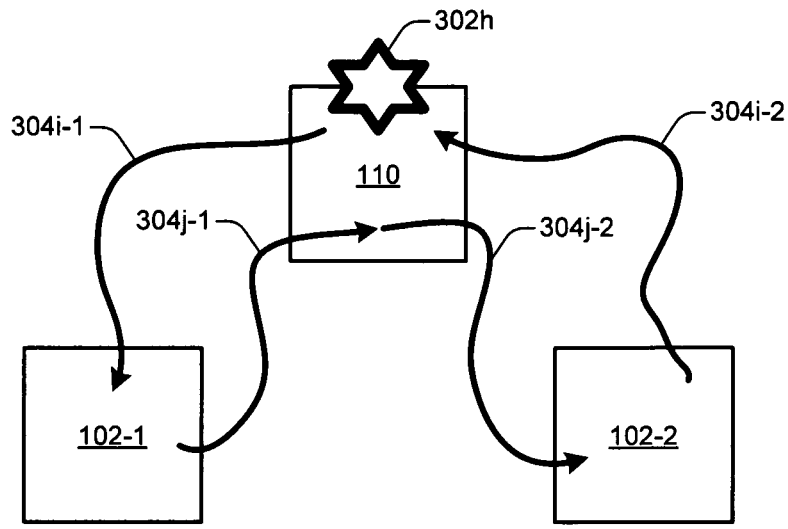

For certain example embodiments, with regard to example scenario 300E of FIG. 3E, a conversion 302h may be performed at a network communication device 110. For certain example implementations, a first user 104-1 may interact with a first communication device 102-1 in accordance with a first communication modality 106-1 for user output interaction and in accordance with a second communication modality 106-2 for user input interaction, or a second user 104-2 may interact with second communication device 102-2 in accordance with a second communication modality 106-2 for user input interaction and for user output interaction. Second user 104-2 may provide user input interaction at second communication device 102-2 in accordance with second communication modality 106-2. Data corresponding to second communication modality 106-2 may be transmitted from second communication device 102-2 or received at network communication device 110 via communication path 304i-2. Data corresponding to second communication modality 106-2 may be converted to data corresponding to first communication modality 106-1 via conversion 302h. Data corresponding to first communication modality 106-1 may be transmitted from network communication device 110 or received at first communication device 102-1 via communication path 304i-1.

For certain example implementations, first communication device 102-1 may present data corresponding to first communication modality 106-1 to first user 104-1 as user output. First communication device 102-1 may accept user input to acquire data corresponding to second communication modality 106-2. First communication device 102-1 may transmit or network communication device 110 may receive data corresponding to second communication modality 106-2 via communication path 304j-1. Data corresponding to second communication modality 106-2 may be transmitted from network communication device 110 or received at second communication device 102-2 via communication path 304j-2. Second communication device 102-2 may present data corresponding to second communication modality 106-2 as user output to second user 104-2. By way of example only, first communication modality 106-1 may comprise voice interaction, and second communication modality 106-2 may comprise video interaction. With conversion 302h, first user 104-1 may interact with first communication device 102-1 via voice for user output interaction and via video for user input interaction, and second user 104-2 may interact with second communication device 102-2 via video for user input and user output. As shown for an example scenario 300E, a communication flow may traverse a network communication device 110 without a conversion being applied thereto.

Figure 3F:
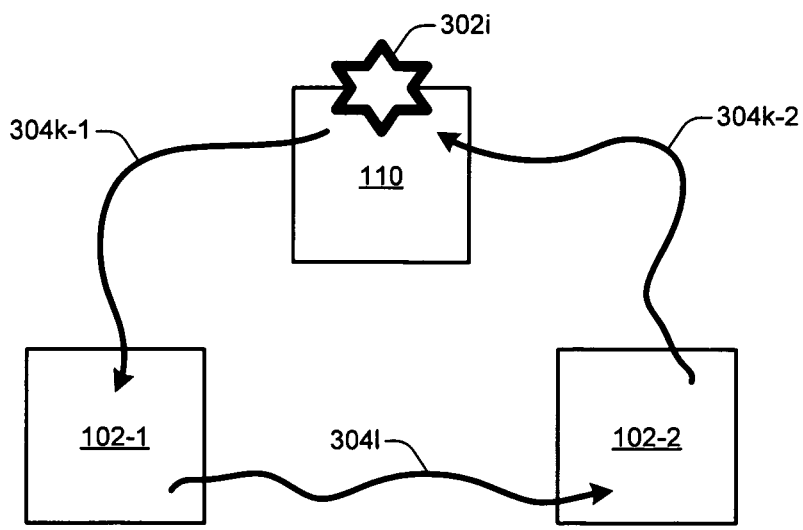

For certain example embodiments, with regard to example scenario 300F of FIG. 3F, a conversion 302i may be performed at a network communication device 110. For certain example implementations, a first user 104-1 may interact with a first communication device 102-1 in accordance with a first communication modality 106-1 for user input interaction and for user output interaction, or a second user 104-2 may interact with second communication device 102-2 in accordance with a second communication modality 106-2 for user input interaction and in accordance with first communication modality 106-1 for user output interaction. Second user 104-2 may provide user input interaction at second communication device 102-2 in accordance with second communication modality 106-2. Data corresponding to second communication modality 106-2 may be transmitted from second communication device 102-2 or received at network communication device 110 via communication path 304k-2. Data corresponding to second communication modality 106-2 may be converted to data corresponding to first communication modality 106-1 via conversion 302i. Data corresponding to first communication modality 106-1 may be transmitted from network communication device 110 or received at first communication device 102-1 via communication path 304k-1.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or second communication device 102-2 may receive data corresponding to first communication modality 106-1 via communication path 304l. Second communication device 102-2 may present data corresponding to first communication modality 106-1 as user output to second user 104-2. As shown by communication path 304l for an example scenario 300F, and in contrast with example scenario 300E (of FIG. 3E), a communication may omit traversal of a network communication device 110 for one part of a communication flow even if that network communication device 110 is performing a conversion for another part of the communication flow.

Figure 3G:
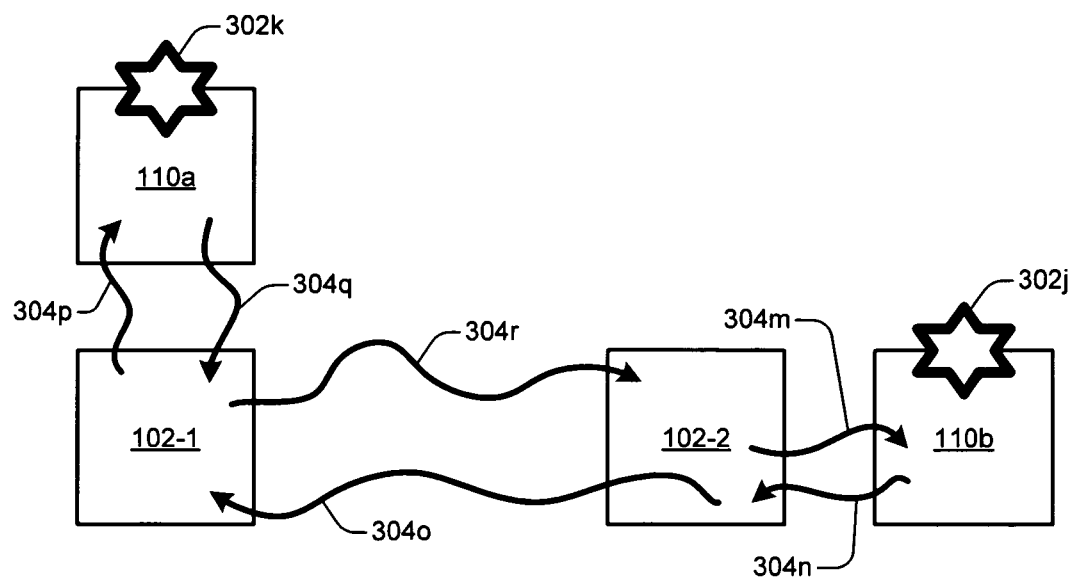
Figure 3H:
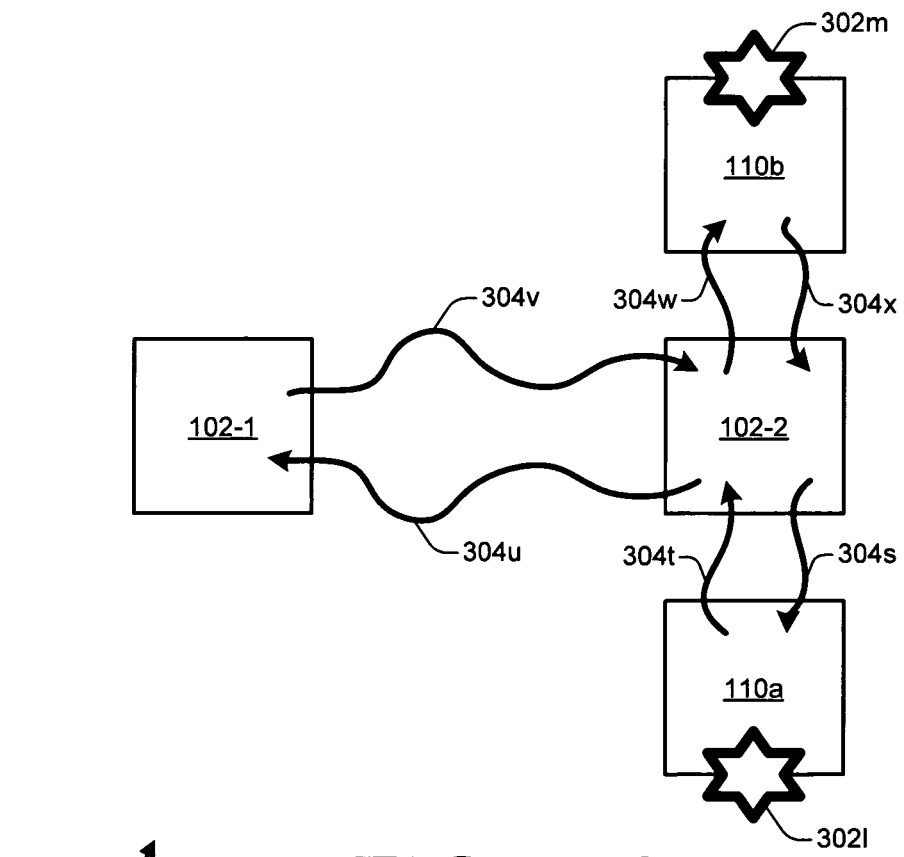

FIGS. 3A-3C illustrate example scenarios 300A-300C in which conversion is performed at a first communication device 102-1 or a second communication device 102-2. A communication device 102 may effectuate a conversion of data from corresponding to one communication modality to corresponding to another communication modality using an on-board converter (e.g., a converter 202). Additionally or alternatively, a communication device 102 may effectuate a conversion of data by causing (e.g., requesting, commanding, notifying, a combination thereof, etc.) a network communication device 110 to perform a conversion. FIGS. 3D-3F illustrate example scenarios 300D-300F in which conversion is performed at a network communication device 110 along a communication path between a first communication device 102-1 and a second communication device 102-2. In contrast, FIGS. 3G and 3H illustrate example scenarios 300G and 300H in which conversion is performed at a network communication device 110 by "farming out" a conversion process. For example, a first communication device 102-1 or a second communication device 102-2 may send data in one communication modality to a network communication device 110 and may receive in return converted data in another communication modality from the network communication device 110.

It should be understood, however, that described scenarios 300A-300H are not mutually exclusive; instead, they may be combined fully or partially or otherwise modified without departing from claimed subject matter. By way of example only, a second communication device 102-2 may perform one conversion itself and farm out another conversion to a network communication device 110. Additionally or alternatively, a network communication device 110 may perform a conversion via an interception of a communication flow, and a first communication device 102-1 may perform another conversion for the communication flow. Additionally or alternatively, a network communication device 110 may itself farm out one, two, or more conversions to other network communication device(s). Moreover, if two or more conversions are farmed out to different network communication devices, the different network communication devices may be associated (e.g., owned by, managed by, operated by, controlled by, a combination thereof, etc.) different entities. Other combinations or modifications of described scenarios may alternatively be implemented.

For certain example embodiments, with regard to example scenario 300G of FIG. 3G, a conversion 302j may be performed at a network communication device 110b, or a conversion 302k may be performed at a network communication device 110a. For certain example implementations, a first user 104-1 may interact with a first communication device 102-1 in accordance with a first communication modality 106-1, or a second user 104-2 may interact with second communication device 102-2 in accordance with a second communication modality 106-2. Second user 104-2 may provide user input interaction at second communication device 102-2 in accordance with second communication modality 106-2. Data corresponding to second communication modality 106-2 may be transmitted from second communication device 102-2 or received at network communication device 110b via communication path 304m. Data corresponding to second communication modality 106-2 may be converted to data corresponding to first communication modality 106-1 via conversion 302j. Data corresponding to first communication modality 106-1 may be transmitted from network communication device 110b or received at second communication device 102-2 via communication path 304n. Data corresponding to first communication modality 106-1 may be transmitted from second communication device 102-2 or received at first communication device 102-1 via communication path 304o.

For certain example implementations, first communication device 102-1 may present data corresponding to first communication modality 106-1 to first user 104-1 as user output. First communication device 102-1 may accept user input to acquire data corresponding to first communication modality 106-1. Data corresponding to first communication modality 106-1 may be transmitted from first communication device 102-1 or received at network communication device 110a via communication path 304p. At conversion 302k, data corresponding to first communication modality 106-1 may be converted to data corresponding to second communication modality 106-2. Data corresponding to second communication modality 106-2 may be transmitted from network communication device 110a or received at first communication device 102-1 via communication path 304q. First communication device 102-1 may transmit or second communication device 102-2 may receive data corresponding to second communication modality 106-2 via communication path 304r. Second communication device 102-2 may present data corresponding to second communication modality 106-2 as user output to second user 104-2. Although conversions 302j and 302k are described as being performed after receiving user input but prior to transmission to another communication device 102, one or more conversions may additionally or alternatively be performed after receiving a transmission of data corresponding to one communication modality but prior to presentation of converted data corresponding to another communication modality. Additionally or alternatively, first communication device 102-1 and second communication device 102-2 may farm out conversion to a single network communication device 110. A network communication device 110a or a network communication device 110b may be associated with a same entity or with different entities.

For certain example embodiments, with regard to example scenario 300H of FIG. 3H, a conversion 302l may be performed at a network communication device 110a, or a conversion 302m may be performed at a network communication device 110b. For certain example implementations, a first user 104-1 may interact with a first communication device 102-1 in accordance with a first communication modality 106-1, or a second user 104-2 may interact with second communication device 102-2 in accordance with a second communication modality 106-2. Second communication device 102-2 may accept user input interaction from second user 104-2 in accordance with second communication modality 106-2. Data corresponding to second communication modality 106-2 may be transmitted from second communication device 102-2 or received at network communication device 110a via communication path 304s. Data corresponding to second communication modality 106-2 may be converted to data corresponding to first communication modality 106-1 via conversion 302l. Data corresponding to first communication modality 106-1 may be transmitted from network communication device 110a or received at second communication device 102-2 via communication path 304t. Data corresponding to first communication modality 106-1 may be transmitted from second communication device 102-2 or received at first communication device 102-1 via communication path 304u.

For certain example implementations, first communication device 102-1 may present data corresponding to first communication modality 106-1 to first user 104-1 as user output. First communication device 102-1 may accept user input to acquire data corresponding to first communication modality 106-1. Data corresponding to first communication modality 106-1 may be transmitted from first communication device 102-1 or received at second communication device 102-2 via communication path 304v. Data corresponding to first communication modality 106-1 may be transmitted from second communication device 102-2 or received at network communication device 110b via communication path 304w. At conversion 302m, data corresponding to first communication modality 106-1 may be converted to data corresponding to second communication modality 106-2. Network communication device 110b may transmit or second communication device 102-2 may receive data corresponding to second communication modality 106-2 via communication path 304x. Second communication device 102-2 may present data corresponding to second communication modality 106-2 as user output to second user 104-2. Although conversions 302l and 302m are described as being performed at a certain point along a communication flow, conversions may additionally or alternatively be performed at different points along a communication flow. Additionally or alternatively, second communication device 102-2 may farm out conversions to a single network communication device 110.

Figure 4:
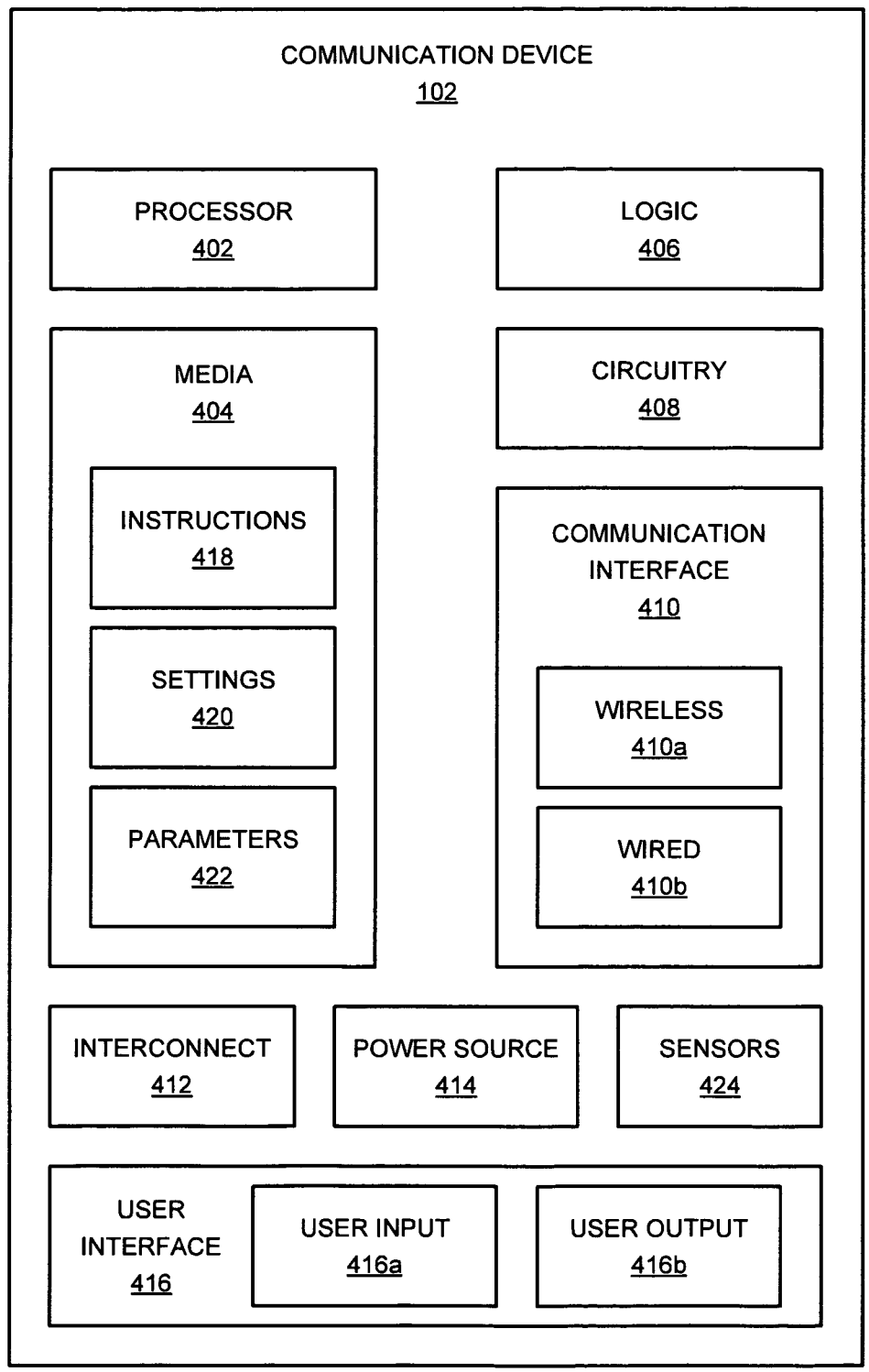
FIG. 4 is a schematic diagram of an example communication device including one or more example components in accordance with certain example embodiments.

FIG. 4 is a schematic diagram 400 of an example communication device including one or more example components in accordance with certain example embodiments. As shown in FIG. 4, a communication device 102 may include one or more components such as: at least one processor 402, one or more media 404, logic 406, circuitry 408, at least one communication interface 410, at least one interconnect 412, at least one power source 414, or at least one user interface 416, one or more sensors 424, any combination thereof, and so forth. Furthermore, as shown in schematic diagram 400, one or more media 404 may comprise one or more instructions 418, one or more settings 420, one or more parameters 422, some combination thereof, and so forth; communication interface 410 may comprise at least one wireless communication interface 410a, at least one wired communication interface 410b, some combination thereof, and so forth; or user interface 416 may comprise at least one user input interface 416a, at least one user output interface 416b, some combination thereof, and so forth. However, a communication device 102 may alternatively include more, fewer, or different components from those that are illustrated without deviating from claimed subject matter.

For certain example embodiments, a communication device 102 may include or comprise at least one electronic device. Communication device 102 may comprise, for example, a computing platform or any electronic device having at least one processor or memory. Processor 402 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 404 may bear, store, contain, provide access to, a combination thereof, etc. instructions 418, which may be executable by processor 402. Instructions 418 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 404 may comprise, by way of example but not limitation, processor-accessible or non-transitory media that is capable of bearing instructions, settings, parameters, a combination thereof, and so forth.

For certain example embodiments, execution of instructions 418 by one or more processors 402 may transform communication device 102 into a special-purpose computing device, apparatus, platform, or any combination thereof, etc. Instructions 418 may correspond to, for example, instructions that are capable of realizing at least a portion of one or more flow diagrams methods, processes, operations, functionality, technology, or mechanisms, etc. that are described herein or illustrated in the accompanying drawings. Settings 420 may comprise, by way of example but not limitation, one or more indicators that may be established by a user or other entity, one or more indicators that may determine at least partly how a communication device 102 is to operate or respond to situations, one or more indicators or other values that may be used to realize flow diagrams, methods, processes, operations, functionality, technology, or mechanisms, etc. that are described herein or illustrated in the accompanying drawings. Parameters 422 may comprise, by way of example but not limitation, one or more indicators that may be established by a user or other entity, one or more indicators that may be determined by a communication device 102, one or more values that may be determined by a user or other entity, one or more values that may be detected by communication device 102, one or more values that may be received from another device that detected them, one or more values that may be determined by communication device 102 or by another device, one or more indicators or values that may determine at least partly how a communication device 102 is to operate or respond to situations, one or more indicators or values that may be used to realize flow diagrams, methods, processes, operations, functionality, technology, or mechanisms, etc. that are described herein or illustrated in the accompanying drawings.

For certain example embodiments, logic 406 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 408 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 408 comprises at least one physical or hardware component or aspect.

For certain example embodiments, one or more communication interfaces 410 may provide one or more interfaces between communication device 102 and another device or a person/operator. With respect to a person/operator, a communication interface 410 may include, by way of example but not limitation, a screen, a speaker, a keyboard or keys, or other person-device input/output features. A wireless communication interface 410a or a wired communication interface 410b may also or alternatively include, by way of example but not limitation, a transceiver (e.g., transmitter or receiver), a radio, an antenna, a wired interface connector or other similar apparatus (e.g., a universal serial bus (USB) connector, a proprietary connector, a Thunderbolt® or Light Peak® connector, a combination thereof, etc.), a physical or logical network adapter or port, or any combination thereof, etc. to communicate wireless signals or wired signals via one or more wireless communication links or wired communication links, respectively. Communications with at least one communication interface 410 may enable transmitting, receiving, or initiating of transmissions, just to name a few examples.

For certain example embodiments, at least one interconnect 412 may enable signal communication between or among components of communication device 102. Interconnect 412 may comprise, by way of example but not limitation, one or more buses, channels, switching fabrics, or combinations thereof, and so forth. Although not explicitly illustrated in FIG. 4, one or more components of communication device 102 may be coupled to interconnect 412 via a discrete or integrated interface. By way of example only, one or more interfaces may couple a communication interface 410 or a processor 402 to at least one interconnect 412. At least one power source 414 may provide power to components of communication device 102. Power source 414 may comprise, by way of example but not limitation, a battery, a power connector, a solar power source or charger, a mechanical power source or charger, a fuel source, any combination thereof, and so forth.

For certain example embodiments, at least one sensor 424 may sense, produce, or otherwise provide at least one sensor value. Sensors 424 may include, by way of example only, a camera, a microphone, an accelerometer, a thermometer, a satellite positioning system (SPS) sensor, a barometer, a humidity sensor, a compass, a gyroscope, a magnetometer, a pressure sensor, an oscillator, a light sensor, an inertial measurement unit (IMU), a tactile sensor, a flexibility sensor, multiple ones thereof, any combination thereof, and so forth. Values provided by at least one sensor 424 may comprise, by way of example but not limitation, an image, a sound recording, an acceleration value, a temperature, SPS coordinates, a barometric pressure, a humidity level, a compass direction, a gyroscopic value, a magnetic reading, a pressure value, an oscillation value, an ambient light reading, inertial readings, touch detections, flex detections, any combination thereof, and so forth.

For certain example embodiments, a user interface 416 may enable one or more users to interact with communication device 102. Interactions between a user and device may relate, by way of example but not limitation, to touch/tactile/feeling/haptic sensory (e.g., a user may shake, bend, twist, or move a device which may be detected by a gyroscope, an accelerometer, a compass, a combination thereof, etc; a user may press a button, slide a switch, rotate a knob, etc.; a user may touch a touch-sensitive screen; a device may vibrate; some combination thereof; etc.), to sound/hearing/speech sensory (e.g., a user may speak into a microphone, a device may generate sounds via a speaker, some combination thereof, etc.), to sights/vision sensory (e.g., a device may activate one or more lights, modify a display screen, a combination thereof, etc.), any combination thereof, and so forth.

For certain example embodiments, a user interface 416 may comprise a user input interface 416a, a user output interface 416b, a combination thereof, and so forth. A user input interface 416a may comprise, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, any combination thereof, and so forth. A user output interface 416b may comprise, by way of example but not limitation, a speaker, a screen (e.g., with or without touch-sensitivity), a vibrating haptic feature, any combination thereof, and so forth. Certain user interfaces 416 may enable both user input and user output. For example, a touch-sensitive screen may be capable of providing user output and accepting user input. Additionally or alternatively, a user interface component (e.g., that may be integrated with or separate from a communication device 102), such as a headset that has a microphone and a speaker, may enable both user input and user output.

It should be understood that for certain example implementations components illustrated separately in FIG. 4 are not necessarily separate or mutually exclusive. For example, a given component may provide multiple functionalities. By way of example only, a single component such as a USB connector may function as a wired communication interface 410b or a power source 414. Additionally or alternatively, a single component such as a display screen may function as a communication interface 410 with a user, as a user input interface 416a, or as a user output interface 416b. Additionally or alternatively, one or more instructions 418 may function to realize at least one setting 420 or at least one parameter 422.

It should also be understood that for certain example implementations components illustrated in schematic diagram 400 or described herein may not be integral or integrated with a communication device 102. For example, a component may be removably connected to a communication device 102, a component may be wirelessly coupled to a communication device 102, any combination thereof, and so forth. By way of example only, instructions 418 may be stored on a removable card having at least one medium 404. Additionally or alternatively, a user interface 416 (e.g., a wired or wireless headset, a screen, a video camera, a keyboard, a combination thereof, etc.) may be coupled to communication device 102 wirelessly or by wire. For instance, a user may provide user input or accept user output corresponding to a voice communication modality to or from, respectively, a communication device 102 via a wireless (e.g., a Bluetooth®) headset that may comprise a user interface 416.

Figure 5:
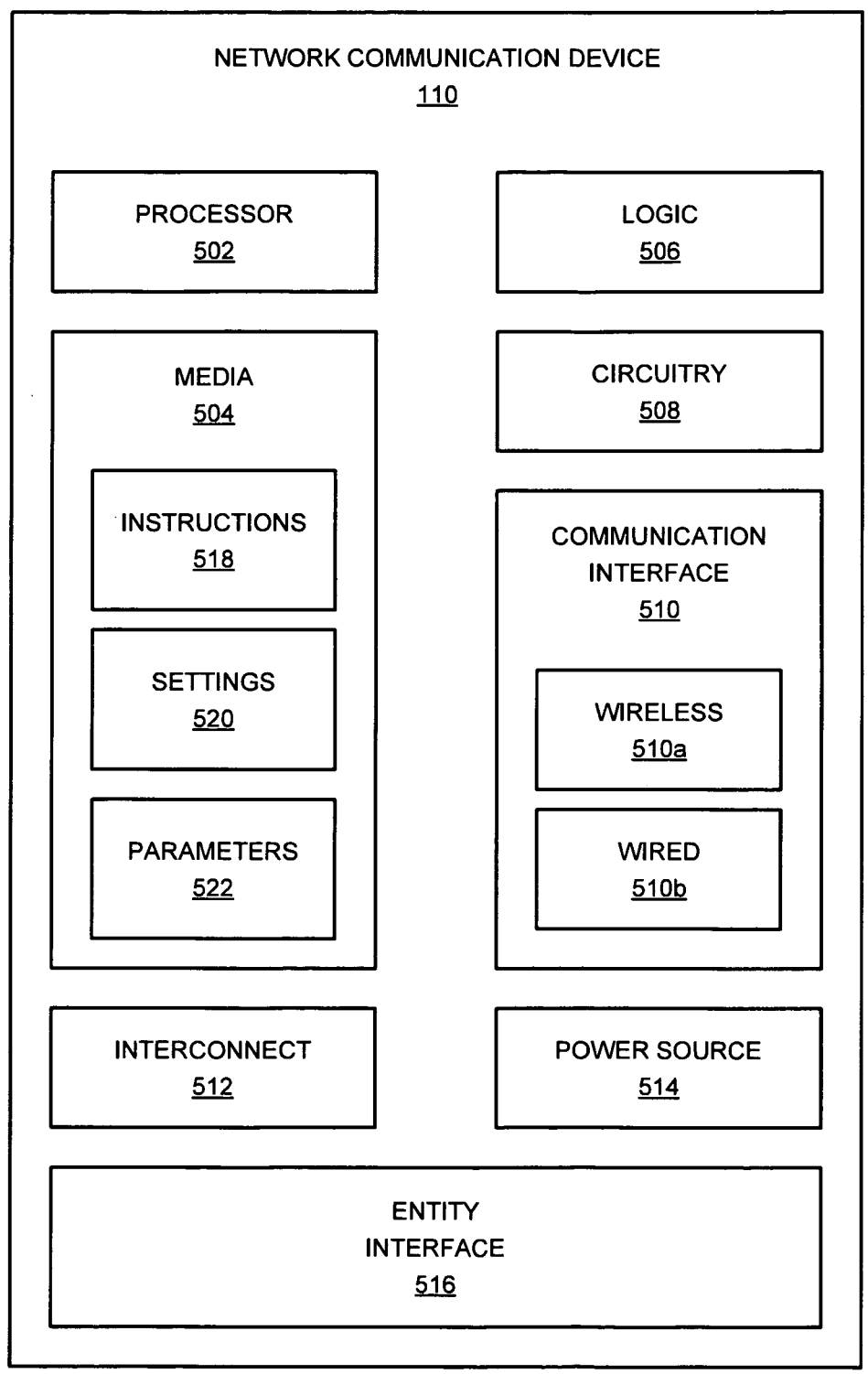
FIG. 5 is a schematic diagram of an example network communication device including one or more example components in accordance with certain example embodiments.

FIG. 5 is a schematic diagram 500 of an example network communication device including one or more example components in accordance with certain example embodiments. As shown in FIG. 5, a network communication device 110 may include one or more components such as: at least one processor 502, one or more media 504, logic 506, circuitry 508, at least one communication interface 510, at least one interconnect 512, at least one power source 514, or at least one entity interface 516, any combination thereof, and so forth. Furthermore, as shown in schematic diagram 500, one or more media 504 may comprise one or more instructions 518, one or more settings 520, one or more parameters 522, some combination thereof, and so forth; or communication interface 510 may comprise at least one wireless communication interface 510a, at least one wired communication interface 510b, some combination thereof, and so forth. However, a network communication device 110 may alternatively include more, fewer, or different components from those that are illustrated without deviating from claimed subject matter.

For certain example embodiments, a network communication device 110 may include or comprise at least one processing or computing device or machine. Network communication device 110 may comprise, for example, a computing platform or any electronic device or devices having at least one processor or memory. Processor 502 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 504 may bear, store, contain, provide access to, a combination thereof, etc. instructions 518, which may be executable by processor 502. Instructions 518 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 504 may comprise, by way of example but not limitation, processor-accessible or non-transitory media that is capable of bearing instructions, settings, parameters, a combination thereof, and so forth.

For certain example embodiments, execution of instructions 518 by one or more processors 502 may transform network communication device 110 into a special-purpose computing device, apparatus, platform, or any combination thereof, etc. Instructions 518 may correspond to, for example, instructions that are capable of realizing at least a portion of one or more flow diagrams methods, processes, operations, functionality, technology, or mechanisms, etc. that are described herein or illustrated in the accompanying drawings. Settings 520 may comprise, by way of example but not limitation, one or more indicators that may be established by a user or other entity, one or more indicators that may determine at least partly how a network communication device 110 is to operate or respond to situations, one or more indicators or other values that may be used to realize flow diagrams, methods, processes, operations, functionality, technology, or mechanisms, etc. that are described herein or illustrated in the accompanying drawings. Parameters 522 may comprise, by way of example but not limitation, one or more indicators that may be established by a user or other entity, one or more indicators that may be determined by a network communication device 110, one or more values that may be determined by a user or other entity, one or more values that may be detected by a network communication device 110, one or more values that may be received from another device that detected them, one or more values that may be determined by network communication device 110 or by another device, one or more indicators or values that may determine at least partly how a network communication device 110 is to operate or respond to situations, one or more indicators or values that may be used to realize flow diagrams, methods, processes, operations, functionality, technology, or mechanisms, etc. that are described herein or illustrated in the accompanying drawings.

For certain example embodiments, logic 506 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 508 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 508 comprises at least one physical or hardware component or aspect.

For certain example embodiments, one or more communication interfaces 510 may provide one or more interfaces between network communication device 110 and another device or a person/operator/entity indirectly. A wireless communication interface 510a or a wired communication interface 510b may also or alternatively include, by way of example but not limitation, a transceiver (e.g., transmitter or receiver), a radio, an antenna, a wired interface connector or other similar apparatus (e.g., a network connector, a universal serial bus (USB) connector, a proprietary connector, a Thunderbolt® or Light Peak® connector, a combination thereof, etc.), a physical or logical network adapter or port, an internet or telecommunications backbone connector, or any combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of network communication device 110. Interconnect 512 may comprise, by way of example but not limitation, one or more buses, channels, switching fabrics, local area networks (LANs), storage area networks (SANs), or combinations thereof, and so forth. Although not explicitly illustrated in FIG. 5, one or more components of network communication device 110 may be coupled to interconnect 512 via a discrete or integrated interface. By way of example only, one or more interfaces may couple a communication interface 510 or a processor 502 to at least one interconnect 512. At least one power source 514 may provide power to components of network communication device 110. Power source 514 may comprise, by way of example but not limitation, a power connector for accessing an electrical grid, a fuel cell, a solar power source, any combination thereof, and so forth.

For certain example embodiments, an entity interface 516 may enable one or more entities (e.g., other devices, persons, groups, a combination thereof, etc.) to provide input to or receive output from network communication device 110. Interactions between entities and a device may relate, by way of example but not limitation, to inputting instructions, commands, settings, parameters, any combination thereof, and so forth. Certain entity interfaces 516 may enable both entity input and entity output at network communication device 110 or over at least one network link.

It should be understood that for certain example implementations components illustrated separately in FIG. 5 are not necessarily separate or mutually exclusive. For example, a given component may provide multiple functionalities. By way of example only, hard-wired logic 506 may form circuitry 508. Additionally or alternatively, a single component such as connector may function as a communication interface 510 or as an entity interface 516. Additionally or alternatively, one or more instructions 518 may function to realize at least one setting 520 or at least one parameter 522.

It should also be understood that for certain example implementations components illustrated in schematic diagram 500 or described herein may not be integral or integrated with a network communication device 110. For example, a component may be removably connected to a network communication device 110, a component may be wirelessly coupled to a network communication device 110, any combination thereof, and so forth. By way of example only, instructions 518 may be stored on one medium 504, and settings 502 or parameters 522 may be stored on a different medium 504, which may comprise a part of a different server of e.g. a server farm. Additionally or alternatively, respective processor-media pairs may be physically realized on respective server blades. Multiple server blades, for instance, may be linked to realize at least one network communication device 110.

Figure 6:
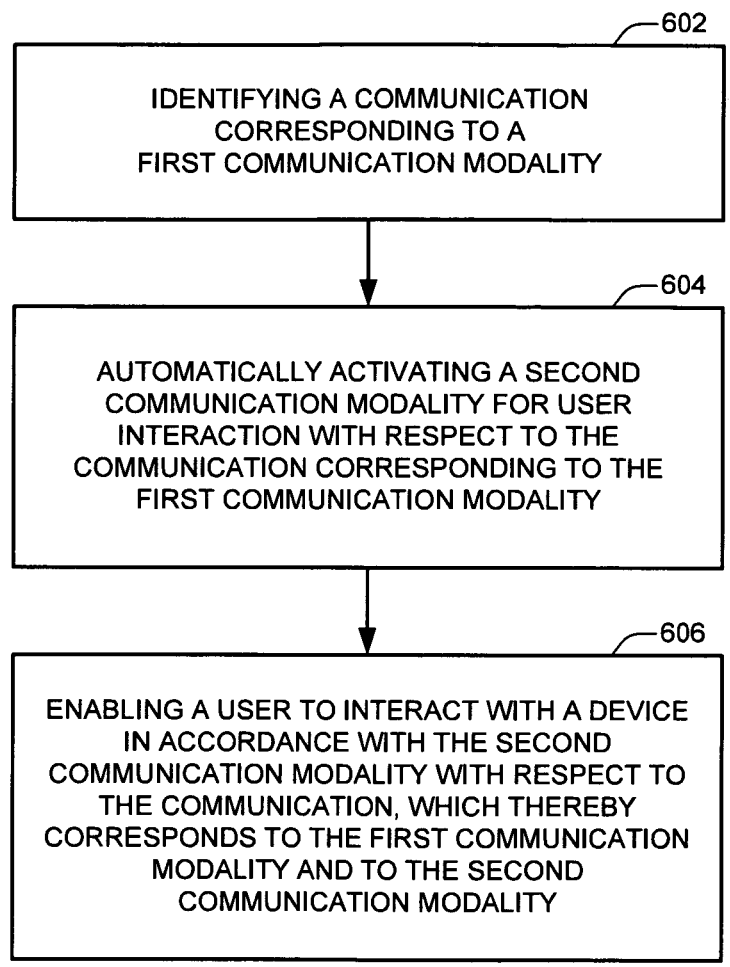
FIG. 6 is a flow diagram illustrating an example method for implementing auto-activation with regard to multi-modality communication in accordance with certain example embodiments.

FIG. 6 is a flow diagram 600 illustrating an example method for implementing auto-activation with regard to multi-modality communication in accordance with certain example embodiments. As illustrated, flow diagram 600 may include any of operations 602-606. Although operations 602-606 are shown or described in a particular order, it should be understood that methods may be performed in alternative manners without departing from claimed subject matter, including, but not limited to, with a different order or number of operations or with a different relationship between or among operations. Also, at least some operations of flow diagram 600 may be performed so as to be fully or partially overlapping with other operation(s). For certain example embodiments, one or more operations of flow diagram 600 may be performed by a communication device (e.g., a communication device 102).

For certain example embodiments, at operation 602, a communication device may identify a communication that corresponds to a first communication modality. For certain example implementations, an identified communication may comprise an incoming communication that is to be terminated at a communication device, may comprise an outgoing communication that is to be initiated at a communication device, any combination thereof, and so forth. By way of example but not limitation, a communication that corresponds to a voice communication modality may be identified.

For certain example embodiments, at operation 604, a communication device may automatically activate a second communication modality for user interaction at the communication device with respect to the communication that corresponds to the first communication modality. For certain example implementations, a communication device may automatically activate a second communication modality (e.g., activate a second communication modality without a contemporaneous user command to do so) for user input interaction, for user output interaction, a combination thereof, etc. with respect to an identified communication that corresponds to a first communication modality. By way of example but not limitation, a communication device may activate a textual communication modality for user input interaction or for user output interaction with respect to an identified communication that corresponds to a voice communication modality.

For certain example embodiments, at operation 606, a communication device may enable a user to interact with it in accordance with a second communication modality with respect to an identified communication, which identified communication may thereby correspond to the first communication modality and to the second communication modality. By way of example but not limitation, a communication device may enable a user to interact with it in accordance with a textual communication modality with respect to an identified communication that corresponds to a voice communication modality, which communication may thereby comprise a multi-modality communication that corresponds to a textual communication modality and a voice communication modality.

Figure 7A:
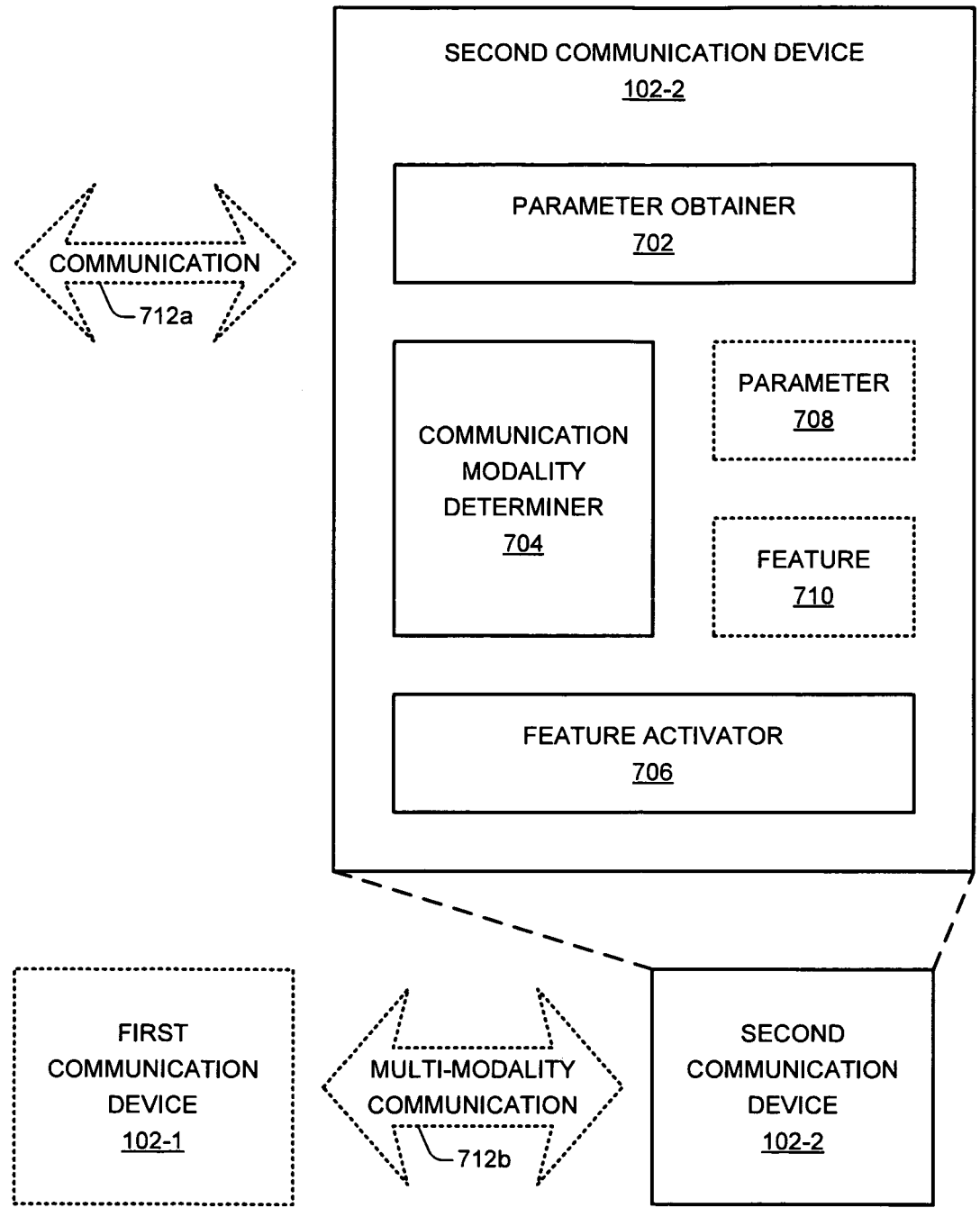
FIG. 7A is a schematic diagram of an example communication device to automatically activate a feature for multi-modality communication in accordance with certain example embodiments.

FIG. 7A is a schematic diagram 700A of an example communication device to automatically activate a feature for multi-modality communication in accordance with certain example embodiments. As shown in FIG. 7A, by way of example but not limitation, schematic diagram 700A may include at least one communication device 102 or at least one communication 712. More specifically, schematic diagram 700A may include a first communication device 102-1, a second communication device 102-2, a communication 712a, or a multi-modality communication 712b. Moreover, second communication device 102-2 may include a parameter obtainer 702, a communication modality determiner 704, a feature activator 706, one or more parameters 708, or at least one feature 710. By way of example but not limitation, parameter obtainer 702, communication modality determiner 704, or feature activator 706 may comprise one or more modules, logic, circuitry, any combination thereof, and so forth.

For certain example embodiments, a communication device 102 (e.g., a second communication device 102-2) for automatic activation of multi-modality communication may comprise: a parameter obtainer 702 for obtaining one or more parameters 708 relating to utilization of communication device 102; a communication modality determiner 704 for determining that user interaction with communication device 102 is to correspond to a second communication modality 106-2 based, at least partly, on one or more parameters 708 relating to utilization of communication device 102; or a feature activator 706 for activating at least one feature 710 that causes a communication 712a corresponding to a first communication modality 106-1 to comprise a multi-modality communication 712b corresponding to first communication modality 106-1 and to second communication modality 106-2 responsive at least partly to a determination by communication modality determiner 704 that user interaction with communication device 102 is to comprise second communication modality 106-2.

Figure 7B:
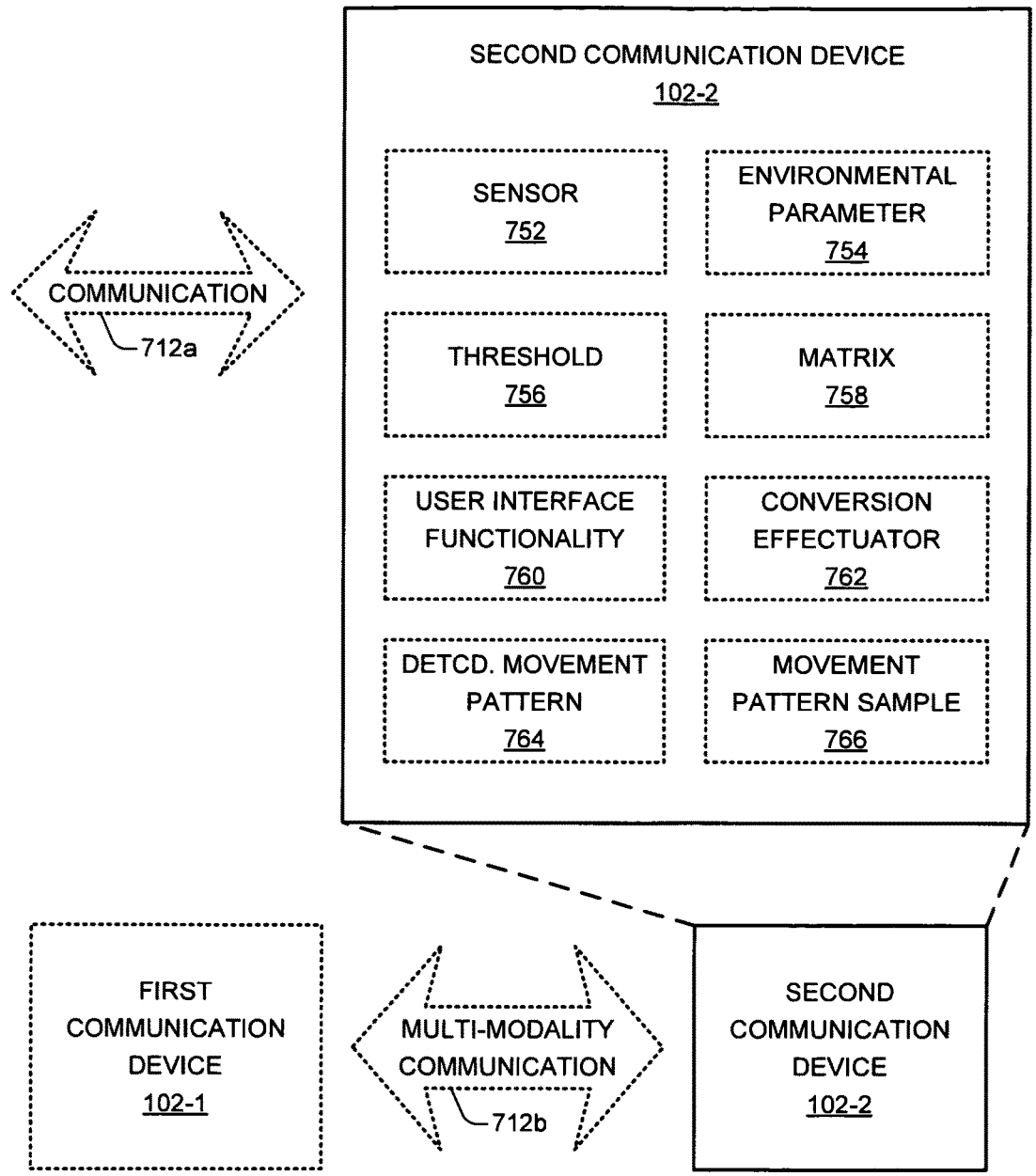
FIG. 7B is a schematic diagram of a communication device that depicts example additional or alternative aspects for automatically activating a feature for multi-modality communication in accordance with certain example embodiments.

FIG. 7B is a schematic diagram 700B of a communication device that depicts example additional or alternative aspects for automatically activating a feature for multi-modality communication in accordance with certain example embodiments. As shown in FIG. 7B, by way of example but not limitation, schematic diagram 700B may include at least one communication device 102 or at least one communication 712. More specifically, schematic diagram 700B may include a first communication device 102-1, a second communication device 102-2, a communication 712a, or a multi-modality communication 712b. Moreover, second communication device 102-2 may comprise one or more example additional or alternative aspects 752-766.

For certain example embodiments, second communication device 102-2 may include at least one sensor 752, at least one environmental parameter 754, at least one threshold 756, at least one matrix 758, at least one user interface functionality 760, at least one conversion effectuator 762, at least one detected movement pattern 764, at least one movement pattern sample 766, any combination thereof, and so forth. Aspects of an example second communication device 102-2 as depicted in schematic diagram 700B are described further herein below with particular reference at least to FIGS. 8B-8J.

Figure 7C:
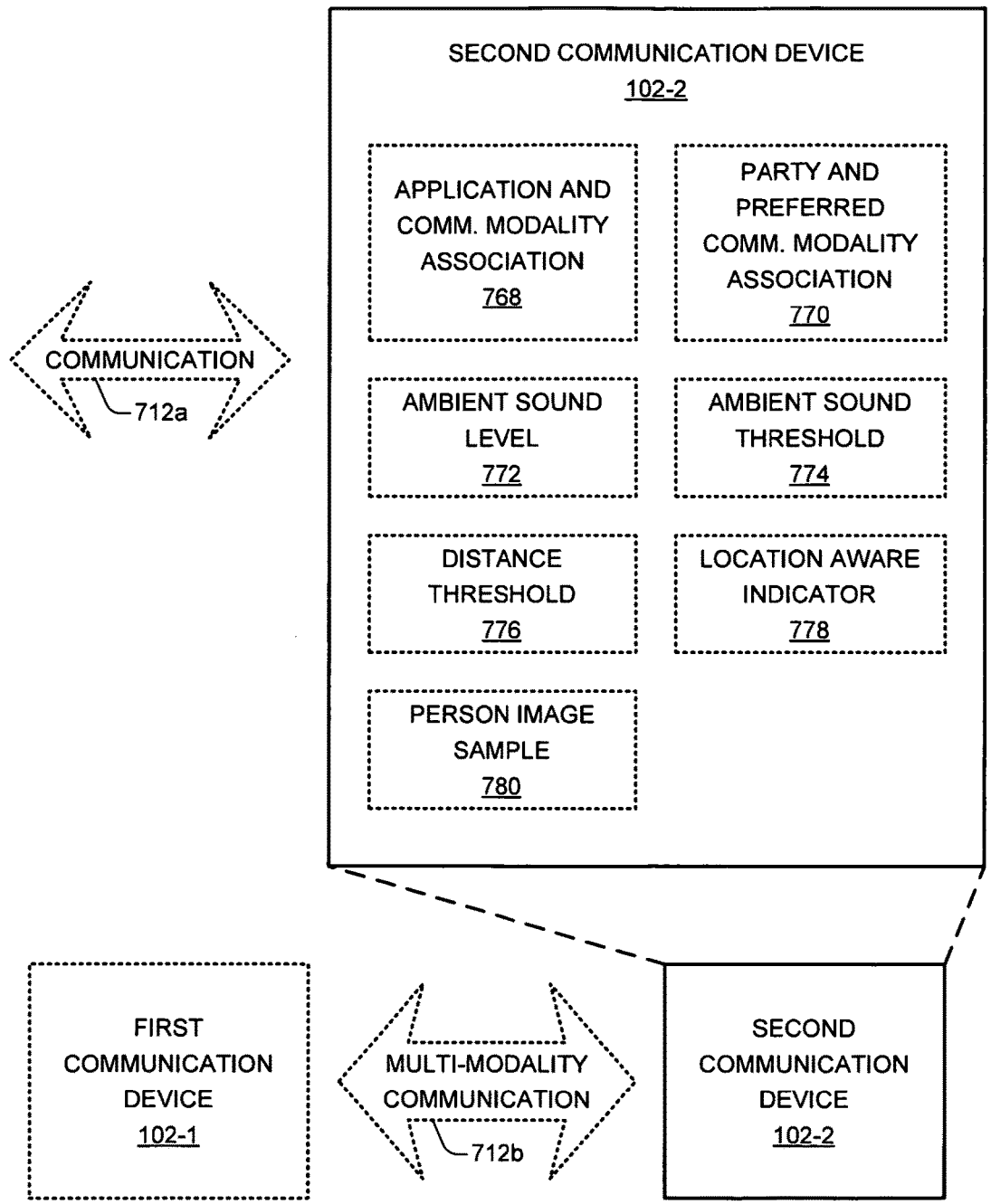
FIG. 7C is a schematic diagram of a communication device that depicts example additional or alternative aspects for automatically activating a feature for multi-modality communication in accordance with certain example embodiments.

FIG. 7C is a schematic diagram 700C of a communication device that depicts example additional or alternative aspects for automatically activating a feature for multi-modality communication in accordance with certain example embodiments. As shown in FIG. 7C, by way of example but not limitation, schematic diagram 700C may include at least one communication device 102 or at least one communication 712. More specifically, schematic diagram 700C may include a first communication device 102-1, a second communication device 102-2, a communication 712a, or a multi-modality communication 712b. Moreover, second communication device 102-2 may comprise one or more example additional or alternative aspects 768-780.

For certain example embodiments, second communication device 102-2 may include at least one application and communication modality association 768, at least one party and preferred communication modality association 770, at least one ambient sound level 772, at least one ambient sound threshold 774, at least one distance threshold 776, at least one location-aware indicator 778, at least one person image sample 780, any combination thereof, and so forth. Aspects of an example second communication device 102-2 as depicted in schematic diagram 700C are described further herein below with particular reference at least to FIGS. 8B-8J.

Figure 8A:
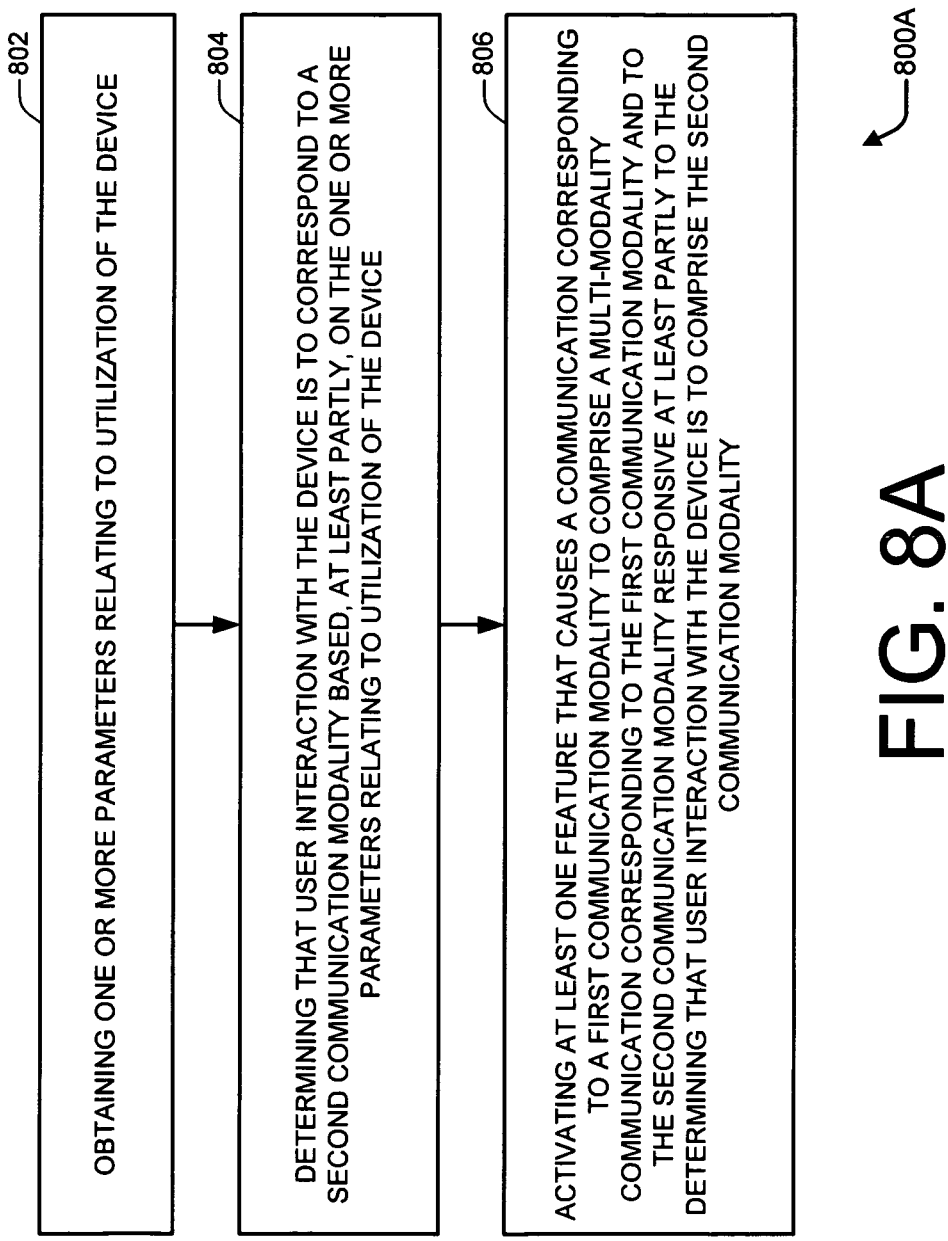
FIG. 8A is a flow diagram illustrating an example method for automatically activating a feature for multi-modality communication in accordance with certain example embodiments.

FIG. 8A is a flow diagram 800A illustrating an example method for automatically activating a feature for multi-modality communication in accordance with certain example embodiments. As illustrated, flow diagram 800A may include any of operations 802-806. Although operations 802-806 are shown or described in a particular order, it should be understood that methods may be performed in alternative manners without departing from claimed subject matter, including, but not limited to, with a different order or number of operations or with a different relationship between or among operations. Also, at least some operations of flow diagram 800A may be performed so as to be fully or partially overlapping with other operation(s).

For certain example embodiments, a method for automatic activation of multi-modality communication, which method may be at least partially implemented using hardware, may comprise an operation 802, an operation 804, or an operation 806. An operation 802 may be directed at least partially to obtaining one or more parameters relating to utilization of the device. By way of example but not limitation, a second communication device 102-2 may obtain one or more parameters 708 relating to utilization of second communication device 102-2. For certain example implementations, one or more parameters 708 may be obtained by detecting at least one parameter using at least one sensor of second communication device 102-2, receiving at least one parameter from a source that is external to second communication device 102-2, retrieving at least one parameter (e.g., at least one setting) from memory of second communication device 102-2, acquiring at least one parameter from a network communication device, acquiring at least one parameter from another communication device (e.g., as part of a communication initiation message or messages, as part of a notification message for a communication, as part of a negotiation for a communication, a combination thereof, etc.), any combination thereof, and so forth. For certain example implementations, a parameter 708 may relate to utilization of a communication device if it relates to where a communication device is being used, if it relates to when a communication device is being used, if it relates to how a communication device is being used, if it relates to who (locally or remotely) is using a communication device (e.g., if it relates to a second user 104-2 that is interacting with a second communication device 102-2, if it relates to a first user 104-1 that is a party to a communication including second communication device 102-2, a combination thereof, etc.), if it relates to why a communication device is being used, any combination thereof, and so forth. Examples of parameters 708 are described herein, including herein below with particular reference to FIGS. 8B-8J. However, claimed subject matter is not limited to any particular described embodiments, implementations, examples, etc.

For certain example embodiments, an operation 804 may be directed at least partially to determining that user interaction with the device is to correspond to a second communication modality based, at least partly, on the one or more parameters relating to utilization of the device. By way of example but not limitation, a second communication device 102-2 may determine that user interaction with second communication device 102-2 is to correspond to a second communication modality 106-2 based, at least partly, on one or more parameters 708 relating to utilization of second communication device 102-2. For certain example implementations, a second communication device 102-2 may determine that a particular communication modality (e.g., a second communication modality 106-2) is to be adopted for user interaction (e.g., interaction by a second user 104-2) with respect to a given communication regardless of which other communication modality or modalities (e.g., a first communication modality 106-1) is to correspond to the given communication based at least partially on one or more parameters 708 that relate to utilization of second communication device 102-2. However, claimed subject matter is not limited to any particular described embodiments, implementations, examples, etc.

For certain example embodiments, an operation 806 may be directed at least partially to activating at least one feature that causes a communication corresponding to a first communication modality to comprise a multi-modality communication corresponding to the first communication modality and to the second communication modality responsive at least partly to the determining that user interaction with the device is to correspond to the second communication modality. By way of example but not limitation, a second communication device 102-2 may activate at least one feature that causes a communication 712a corresponding to a first communication modality 106-1 to comprise a multi-modality communication 712b corresponding to first communication modality 106-1 and to a second communication modality 106-2 responsive at least partly to a determination that user interaction (e.g., by a second user 104-2) with second communication device 102-2 is to comprise second communication modality 106-2. For certain example implementations, a communication device may activate a feature that effectuates a conversion from one communication modality to another communication modality, a feature that notifies a user (e.g., a local user of the communication device or a remote user of another communication device) that a multi-modality communication is being established, a feature that enables a user interface input or output component to accept user input or provide user output (e.g., that activates a text-based application for a voice call, that activates a microphone for a text message, a combination thereof, etc.) in accordance with second communication modality 106-2, any combination thereof, and so forth. However, claimed subject matter is not limited to any particular described embodiments, implementations, examples, etc.

For certain example embodiments, a conversion may be effectuated by performing a conversion locally at a communication device, by causing a conversion to be performed at a remote communication device (e.g., that is associated with another party to a communication), by causing a conversion to be performed at a network communication device, any combination thereof, and so forth. By way of example but not limitation, a conversion may be performed at a network communication device that is to propagate data traffic for a communication regardless of whether a multi-modality conversion is to be performed (e.g., if a network communication device intercepts data along a communication flow path), at a network communication device that would not otherwise be propagating data traffic for a communication but for a multi-modality conversion (e.g., if a communication flow path is redirected through a network communication device), at a network communication device that is being used to farm out a conversion (e.g., wherein a communication device sends data to a network communication device and receives converted data back from the network communication device), any combination thereof, and so forth. Examples of communication paths and conversion scenarios 300A-300H are described herein above with particular reference at least to FIGS. 3A-3H. However, claimed subject matter is not limited to any particular described embodiments, implementations, examples, etc.

FIGS. 8B-8J depict example additions or alternatives for a flow diagram of FIG. 8A in accordance with certain example embodiments. As illustrated, flow diagrams of FIGS. 8B-8J may include any of the illustrated or described operations. Although operations are shown or described in a particular order, it should be understood that methods may be performed in alternative manners without departing from claimed subject matter, including, but not limited to, with a different order or number of operations or with a different relationship between or among operations. Also, at least some operations of flow diagrams of FIGS. 8B-8J may be performed so as to be fully or partially overlapping with other operation(s).

Figure 8B:
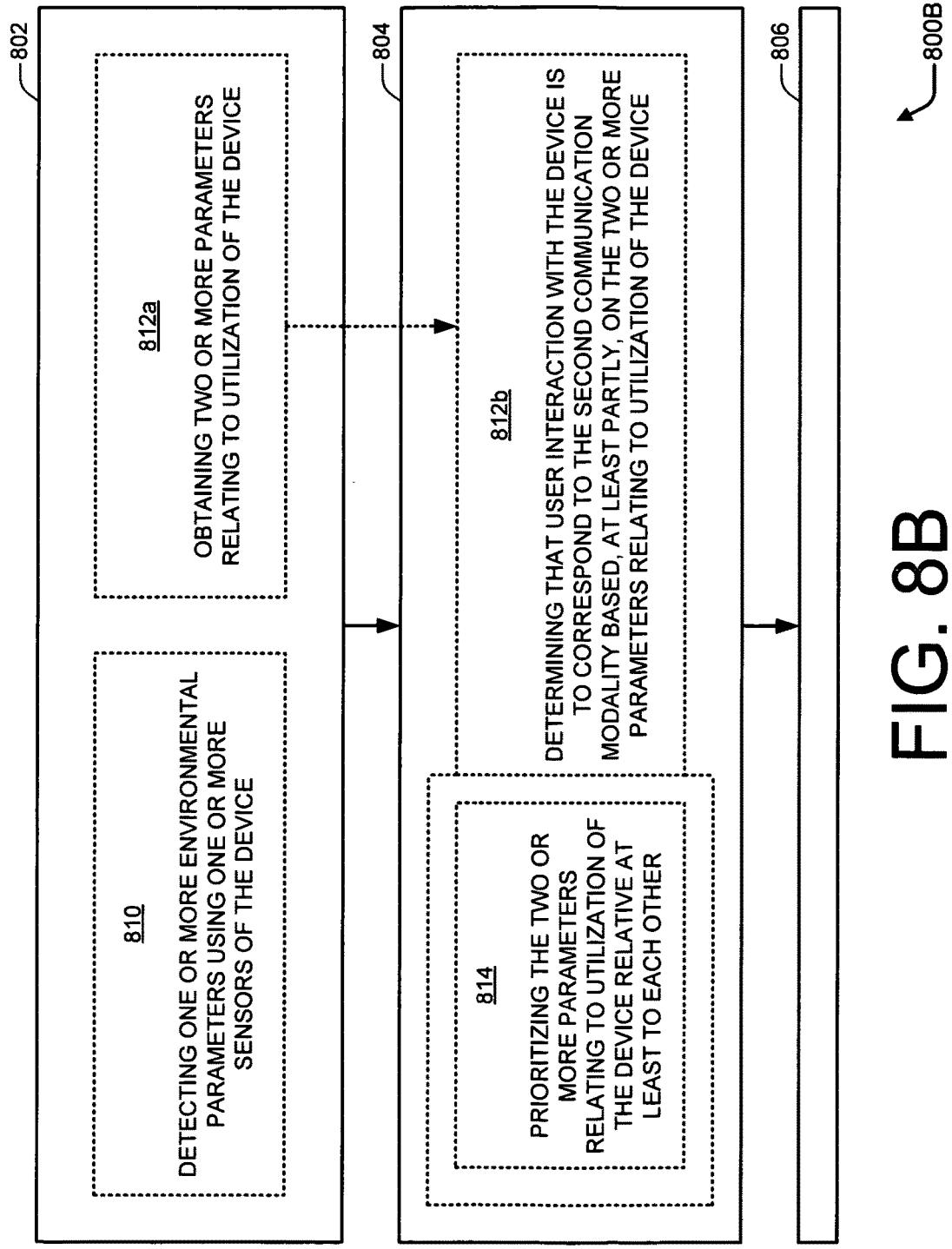

FIG. 8B illustrates a flow diagram 800B having example operations 810, 812a, 812b, or 814. For certain example embodiments, an operation 810 may be directed at least partially to wherein the obtaining one or more parameters relating to utilization of the device (of operation 802) comprises detecting one or more environmental parameters using one or more sensors of the device. By way of example but not limitation, a second communication device 102-2 may detect one or more environmental parameters 754 using one or more sensors 752. Sensors 752 may include, by way of example only, a camera, a microphone, an accelerometer, a thermometer, a satellite positioning system (SPS) sensor, a barometer, a humidity sensor, a compass, a gyroscope, a magnetometer, a pressure sensor, an oscillator, a light sensor, an inertial measurement unit (IMU), multiple ones thereof, any combination thereof, and so forth. Environmental parameters 754 may include, by way of example only, an image, a sound recording, an acceleration value, a temperature, SPS coordinates, a barometric pressure, a humidity level, a compass direction, a gyroscopic value, a magnetic reading, a pressure value, an oscillation value, an ambient light reading, inertial readings, any combination thereof, and so forth. However, claimed subject matter is not limited to any particular described embodiments, implementations, examples, etc.

For certain example embodiments, an operation 812 (e.g., an operation 812a or 812b) may be directed at least partially to wherein: the obtaining one or more parameters relating to utilization of the device (of operation 802) comprises obtaining two or more parameters relating to utilization of the device (for operation 812a) and the determining that user interaction with the device is to correspond to a second communication modality based, at least partly, on the one or more parameters relating to utilization of the device (of operation 804) comprises determining that user interaction with the device is to correspond to the second communication modality based, at least partly, on the two or more parameters relating to utilization of the device (for operation 812b). By way of example but not limitation, a second communication device 102-2 may obtain two or more parameters 708 relating to utilization thereof or determine that user interaction with second communication device 102-2 is to correspond to a second communication modality 106-2 based, at least partly, on the two or more parameters 708 relating to utilization of the device. Two or more parameters 708 may include, by way of example only, a time and a schedule entry, a time and a location, a location and an identity of another party, a temperature and an ambient noise level, an identity of a person that is within sensory range of a device and a calling party, any combination thereof, and so forth. However, claimed subject matter is not limited to any particular described embodiments, implementations, examples, etc.

For certain example embodiments, an operation 814 may be directed at least partially to wherein the determining that user interaction with the device is to correspond to the second communication modality based, at least partly, on the two or more parameters relating to utilization of the device (of operation 812b) comprises prioritizing the two or more parameters relating to utilization of the device relative at least to each other. By way of example but not limitation, two or more parameters 708 may be prioritized such that if two or more communication modalities 106 that result from an analysis of two or more parameters 708 are in conflict during an operation of determining, a communication modality may be determined based at least partly on a prioritization of the two or more parameters 708. For certain example implementations, a user 104 of a communication device 102 may be empowered to prioritize two or more parameters 708. For instance, an identity of a caller may be prioritized higher than a schedule entry, or an ambient sound level may be prioritized higher than a location. However, claimed subject matter is not limited to any particular described embodiments, implementations, examples, etc.

Figure 8C:
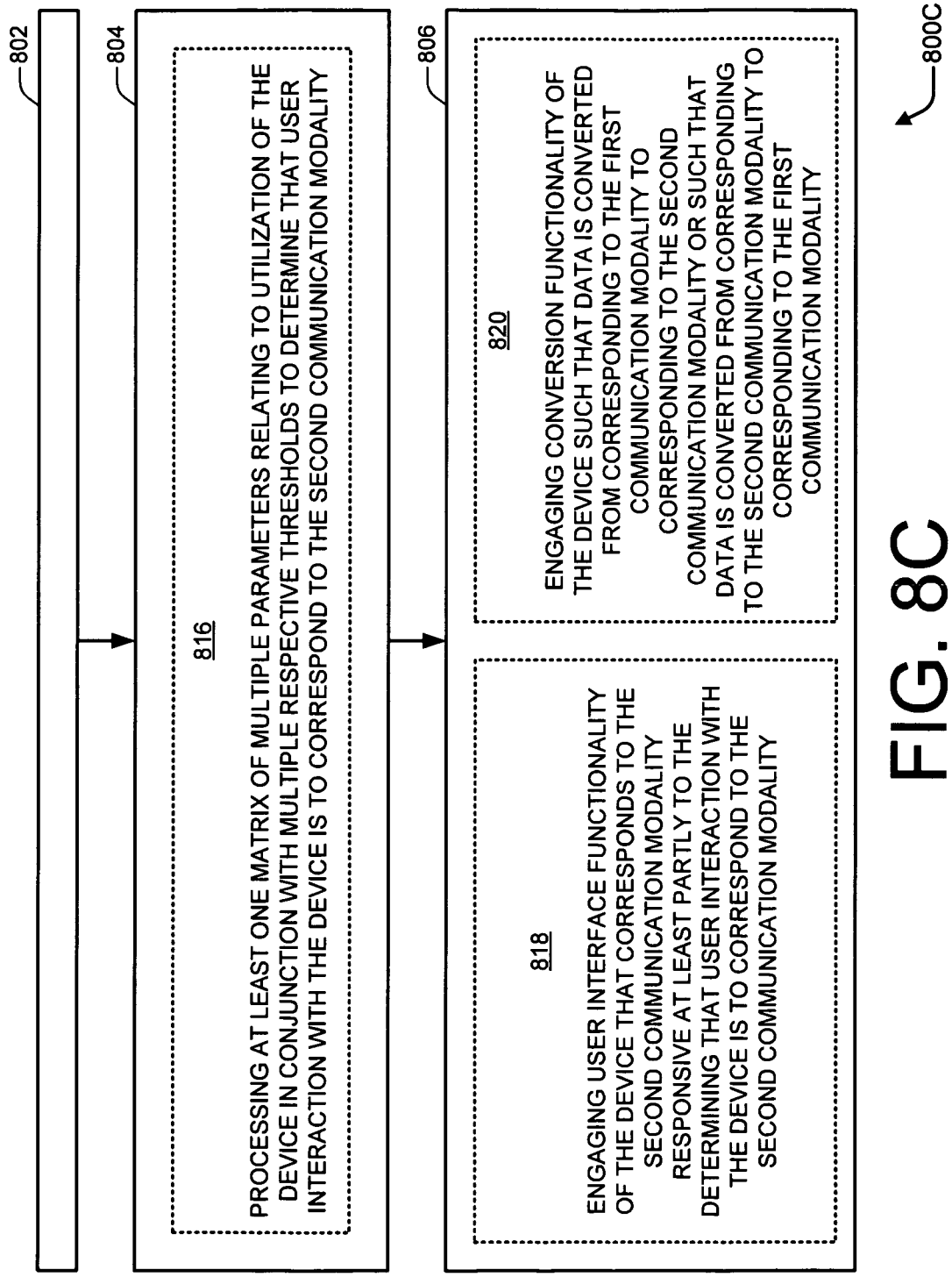

FIG. 8C illustrates a flow diagram 800C having example operations 816, 818, or 820. For certain example embodiments, an operation 816 may be directed at least partially to wherein the determining that user interaction with the device is to correspond to a second communication modality based, at least partly, on the one or more parameters relating to utilization of the device (of operation 804) comprises processing at least one matrix of multiple parameters relating to utilization of the device in conjunction with multiple respective thresholds to determine that user interaction with the device is to correspond to the second communication modality. By way of example but not limitation, multiple respective parameters 708 may be compared to multiple respective thresholds 756 in at least one matrix 758 to determine that user interaction is to correspond to a second communication modality 106-2. For certain example implementations, a time may be compared to one or more temporal thresholds in one or more schedule entries of a calendar, an ambient sound level may be compared to at least one ambient sound threshold, an ambient light level may be compared to at least one ambient light threshold, a detected movement pattern may be compared to at least one threshold from a movement pattern sample, a temperature may be compared to at least one temperature threshold, a received signal strength level may be compared to at least one received signal strength threshold, any combination thereof, and so forth. Matrix components and respective thresholds may be prioritized. However, claimed subject matter is not limited to any particular described embodiments, implementations, examples, etc.

For certain example embodiments, an operation 818 may be directed at least partially to wherein the activating at least one feature that causes a communication corresponding to a first communication modality to comprise a multi-modality communication corresponding to the first communication modality and to the second communication modality responsive at least partly to the determining that user interaction with the device is to correspond to the second communication modality (of operation 806) comprises engaging user interface functionality of the device that corresponds to the second communication modality responsive at least partly to the determining that user interaction with the device is to correspond to the second communication modality. By way of example but not limitation, a second communication device 102-2 may engage user interface functionality 760 that corresponds to a second communication modality 106-2 responsive at least partly to the determining that user interaction is to correspond to second communication modality 106-2. For certain example implementations, user interface functionality 760 may comprise an application or a part of an operating system that facilitates interaction in accordance with second communication modality 106-2, may comprise a hardware input or output interface component that facilitates interaction in accordance with second communication modality 106-2, any combination thereof, and so forth. However, claimed subject matter is not limited to any particular described embodiments, implementations, examples, etc.

For certain example embodiments, an operation 820 may be directed at least partially to wherein the activating at least one feature that causes a communication corresponding to a first communication modality to comprise a multi-modality communication corresponding to the first communication modality and to the second communication modality responsive at least partly to the determining that user interaction with the device is to correspond to the second communication modality (of operation 806) comprises engaging conversion functionality of the device such that data is converted from corresponding to the first communication modality to corresponding to the second communication modality or such that data is converted from corresponding to the second communication modality to corresponding to the first communication modality. By way of example but not limitation, a second communication device 102-2 may engage conversion functionality such that data is converted from corresponding to a first communication modality 106-1 to corresponding to a second communication modality 106-2 or such that data is converted from corresponding to second communication modality 106-2 to corresponding to first communication modality 106-1. For certain example implementations, a second communication device 102-2 may engage a converter 202 (e.g., of FIG. 2) to convert data received from another device into corresponding to a second communication modality 106-2 prior to presenting it to a second user 104-2 or to convert data accepted from a second user 104-2 into corresponding to a first communication modality 106-1 prior to transmission to a first communication device 102-1. However, claimed subject matter is not limited to any particular described embodiments, implementations, examples, etc.

FIG. 8D illustrates a flow diagram 800D having example operations 822, 824a, 824b, or 824c. For certain example embodiments, an operation 822 may be directed at least partially to wherein the activating at least one feature that causes a communication corresponding to a first communication modality to comprise a multi-modality communication corresponding to the first communication modality and to the second communication modality responsive at least partly to the determining that user interaction with the device is to correspond to the second communication modality (of operation 806) comprises causing a conversion of data associated with the multi-modality communication to occur at another device, the conversion comprising a conversion from corresponding to the first communication modality to corresponding to the second communication modality or from corresponding to the second communication modality to corresponding to the first communication modality. By way of example but not limitation, a second communication device 102-2 may cause a conversion of data associated with a multi-modality communication 712b to occur at another device, the conversion comprising a conversion from corresponding to a first communication modality 106-1 to corresponding to a second communication modality 106-2 or from corresponding to second communication modality 106-2 to corresponding to first communication modality 106-1. For certain example implementations, a conversion effectuator 762 of a second communication device 102-2 may cause another device (e.g., a first communication device 102-1, a network communication device 110, a combination thereof, etc.) to perform a conversion for a multi-modality communication 712b (e.g., by sending a request to convert, a notification that a conversion is applicable, a command to perform a conversion, one or more variables indicating how a conversion is to be performed, a combination thereof, etc.). However, claimed subject matter is not limited to any particular described embodiments, implementations, examples, etc.

For certain example embodiments, an operation 824 (e.g., an operation 824a, 824b, or 824c) may be directed at least partially to wherein: the obtaining one or more parameters relating to utilization of the device (of operation 802) comprises identifying at least one schedule entry of a calendar associated with the device (for operation 824a) and ascertaining a current time (for operation 824b); and the determining that user interaction with the device is to correspond to a second communication modality based, at least partly, on the one or more parameters relating to utilization of the device (of operation 804) comprises determining that the current time matches a scheduled time corresponding to the at least one schedule entry of the calendar associated with the device (for operation 824c). By way of example but not limitation, a second communication device 102-2 may identify at least one schedule entry of a calendar that is associated with the device (e.g., that is stored at least partially on the device, that is associated with an owner of the device, that is associated with a user of the device, that is associated with an account that is linked to the device, a combination thereof, etc.) or may ascertain a current time, which may include a day or date. By way of example but not limitation, a second communication device 102-2 may further determine that a current time matches a scheduled time corresponding to at least one schedule entry of a calendar that is associated with the device. A current time may match a scheduled time if, for example, the current time (or day/date and time) falls within a timeframe (which may include an extended window on either or both sides of a start time or an end time) of a scheduled time of a schedule entry. For certain example implementations, a user may prefer to accept voice call communications as corresponding at least partially to text at a device of the user during a scheduled event, such as a meeting or appointment, that corresponds to a schedule entry of a calendar. However, claimed subject matter is not limited to any particular described embodiments, implementations, examples, etc.

Figure 8E:
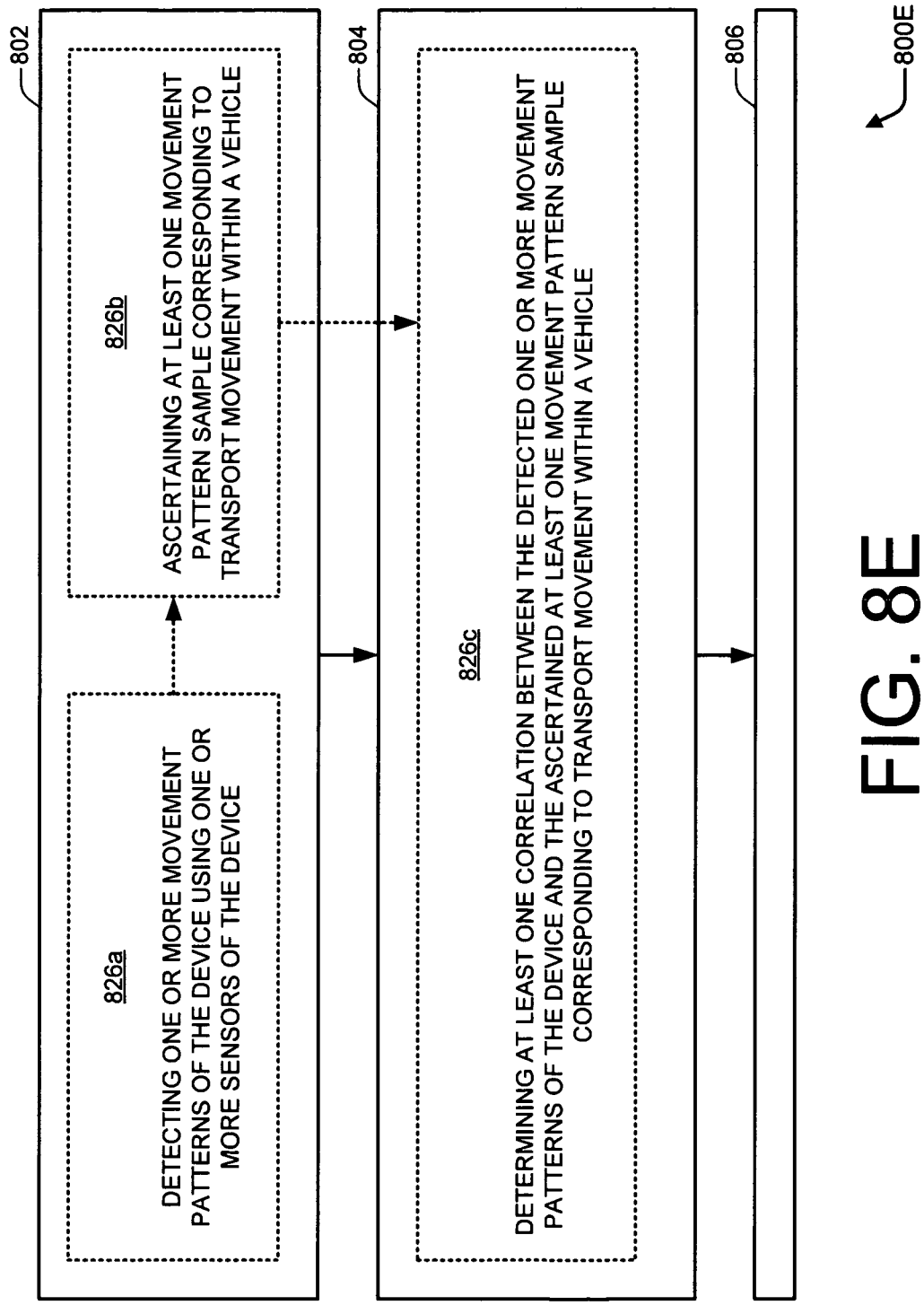

FIG. 8E illustrates a flow diagram 800E having example operations 826a, 826b, or 826c. For certain example embodiments, an operation 826 (e.g., an operation 826a, 826b, or 826c) may be directed at least partially to wherein: the obtaining one or more parameters relating to utilization of the device (of operation 802) comprises detecting one or more movement patterns of the device using one or more sensors of the device (for operation 826a) and ascertaining at least one movement pattern sample corresponding to transport movement within a vehicle (for operation 826b); and the determining that user interaction with the device is to correspond to a second communication modality based, at least partly, on the one or more parameters relating to utilization of the device (of operation 804) comprises determining at least one correlation between the detected one or more movement patterns of the device and the ascertained at least one movement pattern sample corresponding to transport movement within a vehicle (for operation 826c). By way of example but not limitation, a second communication device 102-2 may detect one or more movement patterns 764 of the device using one or more sensors (e.g., sensor(s) 752) thereof and may ascertain at least one movement pattern sample 766 corresponding to transport movement within a vehicle. For certain example implementations, at least one detected movement pattern 764 may include one or more measurements from at least one of an accelerometer, a gyroscope, a compass, a combination thereof, etc. over a period of time. For certain example implementations, at least one movement pattern sample 766 may include values (including a range of values) that at least one of an accelerometer, a gyroscope, a compass, a combination thereof, etc. would be expected to detect while being positioned within a vehicle that is in motion. A movement pattern sample 766 may be synthesized or may be recorded using a vehicle that is in motion; a movement pattern sample 766 may comprise a combination or derivation of multiple other movement pattern samples. A recorded movement pattern sample 766 may be recorded by a second communication device 102-2 at one or more times prior to usage or may be downloaded from an external device (e.g., a network communication device 110). By way of example but not limitation, a second communication device 102-2 may determine at least one correlation (e.g., a relationship, one or more similarities, one or more differences, a mathematical correlation, a combination thereof, etc.) between one or more detected movement patterns 764 of the device and an ascertained at least one movement pattern sample 766 corresponding to transport movement within a vehicle. For certain example implementations, if a determined correlation meets (e.g., equals or exceeds a correlation threshold), a second communication device 102-2 may determine that it is currently positioned within a moving vehicle. If a communication device is positioned within a moving vehicle, visually-oriented user interaction modalities (e.g., text or video) may be avoided via at least one communication modality conversion (e.g., to voice). However, claimed subject matter is not limited to any particular described embodiments, implementations, examples, etc.

Figure 8F:
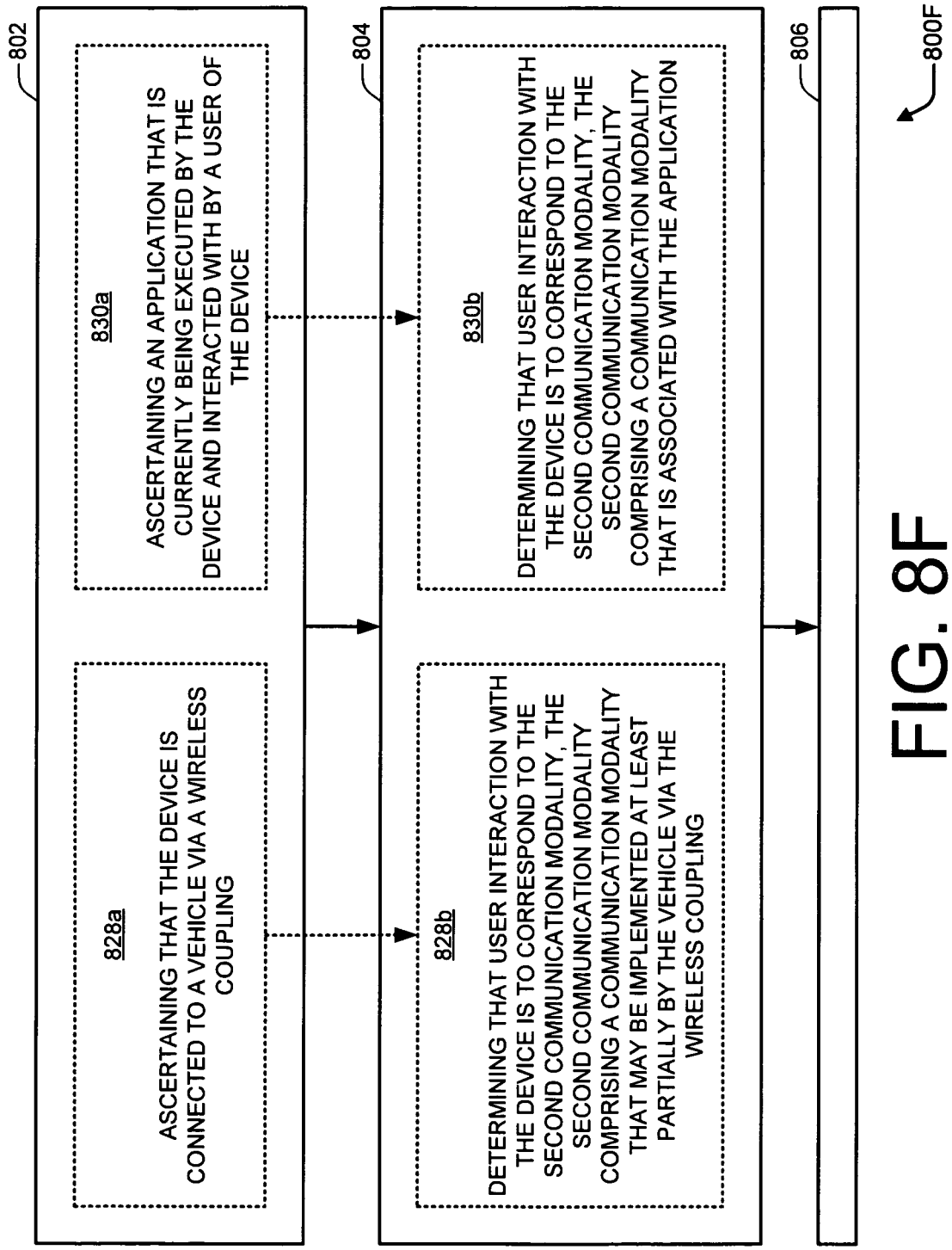

FIG. 8F illustrates a flow diagram 800F having example operations 828a, 828b, 830a, or 830b. For certain example embodiments, an operation 828 (e.g., an operation 828a or 828b) may be directed at least partially to wherein: the obtaining one or more parameters relating to utilization of the device (of operation 802) comprises ascertaining that the device is connected to a vehicle via a wireless coupling (for operation 828a) and the determining that user interaction with the device is to correspond to a second communication modality based, at least partly, on the one or more parameters relating to utilization of the device (of operation 804) comprises determining that user interaction with the device is to correspond to the second communication modality, the second communication modality comprising a communication modality that may be implemented at least partially by the vehicle via the wireless coupling (for operation 828b). By way of example but not limitation, a second communication device 102-2 may ascertain that the device is connected to a vehicle via a wireless coupling or determine that user interaction with the device is to correspond to the second communication modality, the second communication modality comprising a communication modality that may be implemented at least partially by the vehicle via the wireless coupling. For certain example implementations, a second communication device 102-2 may ascertain that it is wirelessly linked to a vehicle via a short-range wireless interface (e.g., via Bluetooth®, via Wi-Fi, a combination thereof, etc.) or determine that user interaction is to correspond to a second communication modality 106-2 that is capable of being implemented using the short-range wireless interface with the vehicle. However, claimed subject matter is not limited to any particular described embodiments, implementations, examples, etc.

For certain example embodiments, an operation 830 (e.g., an operation 830a or 830b) may be directed at least partially to wherein: the obtaining one or more parameters relating to utilization of the device (of operation 802) comprises ascertaining an application that is currently being executed by the device and interacted with by a user of the device (for operation 830a) and the determining that user interaction with the device is to correspond to a second communication modality based, at least partly, on the one or more parameters relating to utilization of the device (of operation 804) comprises determining that user interaction with the device is to correspond to the second communication modality, the second communication modality comprising a communication modality that is associated with the application (for operation 830b). By way of example but not limitation, a second communication device 102-2 may ascertain that an application is currently being executed by the device and interacted with by a user of the device (e.g., that a given application is running and is at least partially visible to or receiving input from a user). By way of example but not limitation, a second communication device 102-2 may further determine that user interaction is to correspond to a second communication modality 106-2, with second communication modality 106-2 comprising a communication modality that is associated with the application. For certain example implementations, an application and communication modality association 768 (e.g., which may comprise a single entry for a single application, a table including applications and associated communication modalities, a table having communication modalities and applications listed under a respective communication modality, a combination thereof, etc.) may be retrieved from memory to determine a particular communication modality that is associated with a given application. For instance, a user may not want any screen real estate consumed by a texting application if the user is playing a given game, so a voice communication modality may be associated with the given game such that texting communications are converted to voice user interaction. Additionally or alternatively, a user that is listening to music via a music application may want incoming voice communications to be converted to a multi-modality communication having textual interaction for the user. Additionally or alternatively, a user that is interacting with a video communication application may want incoming voice communications to be automatically converted at least partially to text. However, claimed subject matter is not limited to any particular described embodiments, implementations, examples, etc.

For certain example embodiments, a method may further be directed at least partially to wherein the application comprises a game, the first communication modality comprises a textual interaction modality or a video interaction modality, and the second communication modality comprises a voice interaction modality. By way of example but not limitation, an application and communication modality association 768 may associate a given gaming application with a voice interaction modality. For certain example implementations, an incoming textual or video communication may be automatically converted into a voice interaction modality based at least partially on application and communication modality association 768 if the user is currently interacting with the given gaming application when notification of an incoming textual or video communication is received. However, claimed subject matter is not limited to any particular described embodiments, implementations, examples, etc.

Figure 8G:
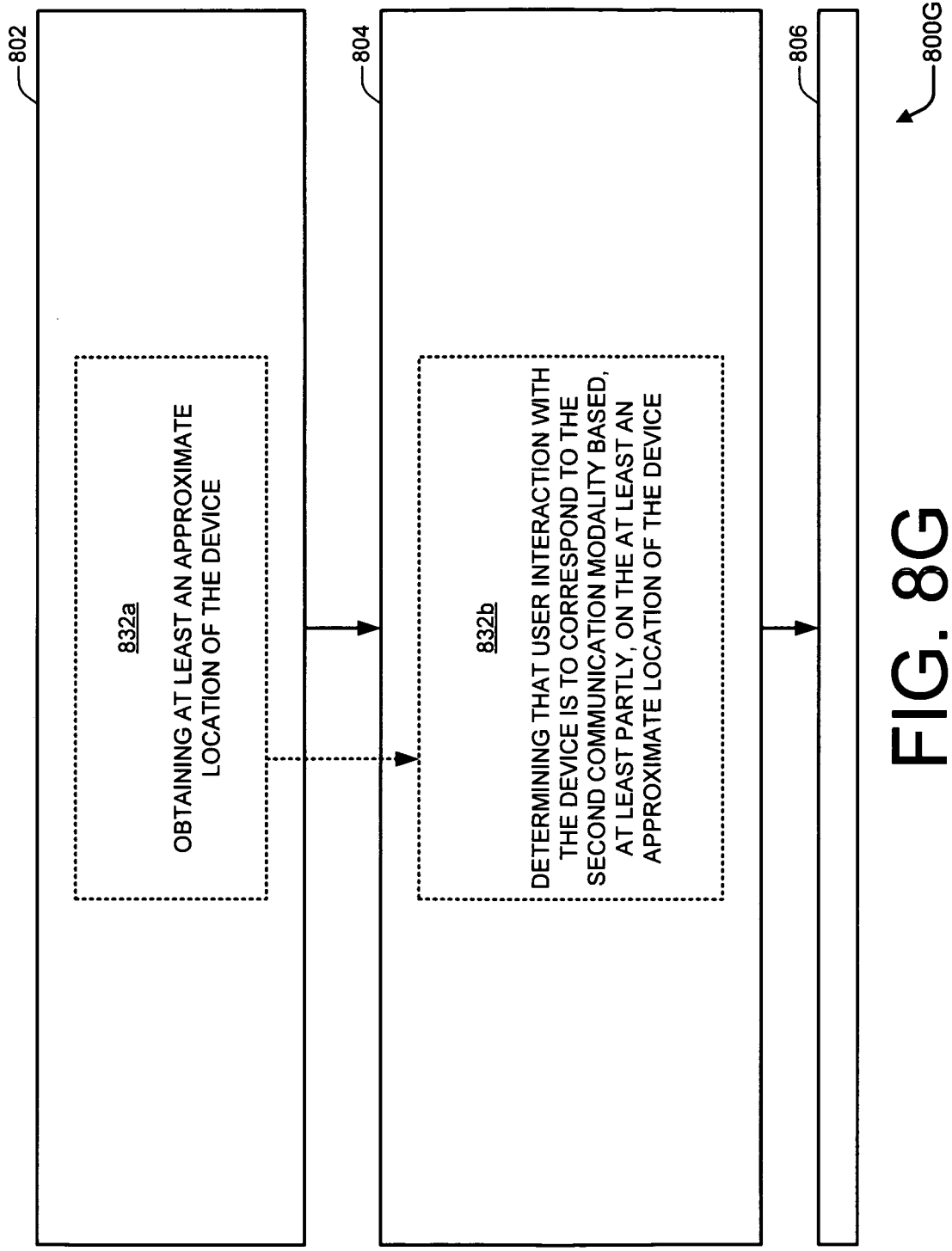

FIG. 8G illustrates a flow diagram 800G having example operations 832*a* or 832*b*. For certain example embodiments, an operation 832 (e.g., an operation 832*a* or 832*b*) may be directed at least partially to wherein: the obtaining one or more parameters relating to utilization of the device (of operation 802) comprises obtaining at least an approximate location of the device (for operation 832*a*) and the determining that user interaction with the device is to correspond to a second communication modality based, at least partly, on the one or more parameters relating to utilization of the device (of operation 804) comprises determining that user interaction with the device is to correspond to the second communication modality based, at least partly, on the at least an approximate location of the device (for operation 832*b*). By way of example but not limitation, a second communication device 102-2 may obtain at least an approximate location of the device or may determine that user interaction with the device is to correspond to a second communication modality 106-2 based, at least partly, on at least an approximate location of the device. For certain example implementations, a location of a device may comprise SPS coordinates; an address; a location indicated by a user; an area, region, or neighborhood; a destination; a location derived from one or more Wi-Fi networks, at least one cellular base station, or SPS coordinates; a location gleaned from a calendar associated with the device; a location inferred from a time of day or day of week; any combination thereof, and so forth. However, claimed subject matter is not limited to any particular described embodiments, implementations, examples, etc.

Figure 8H:
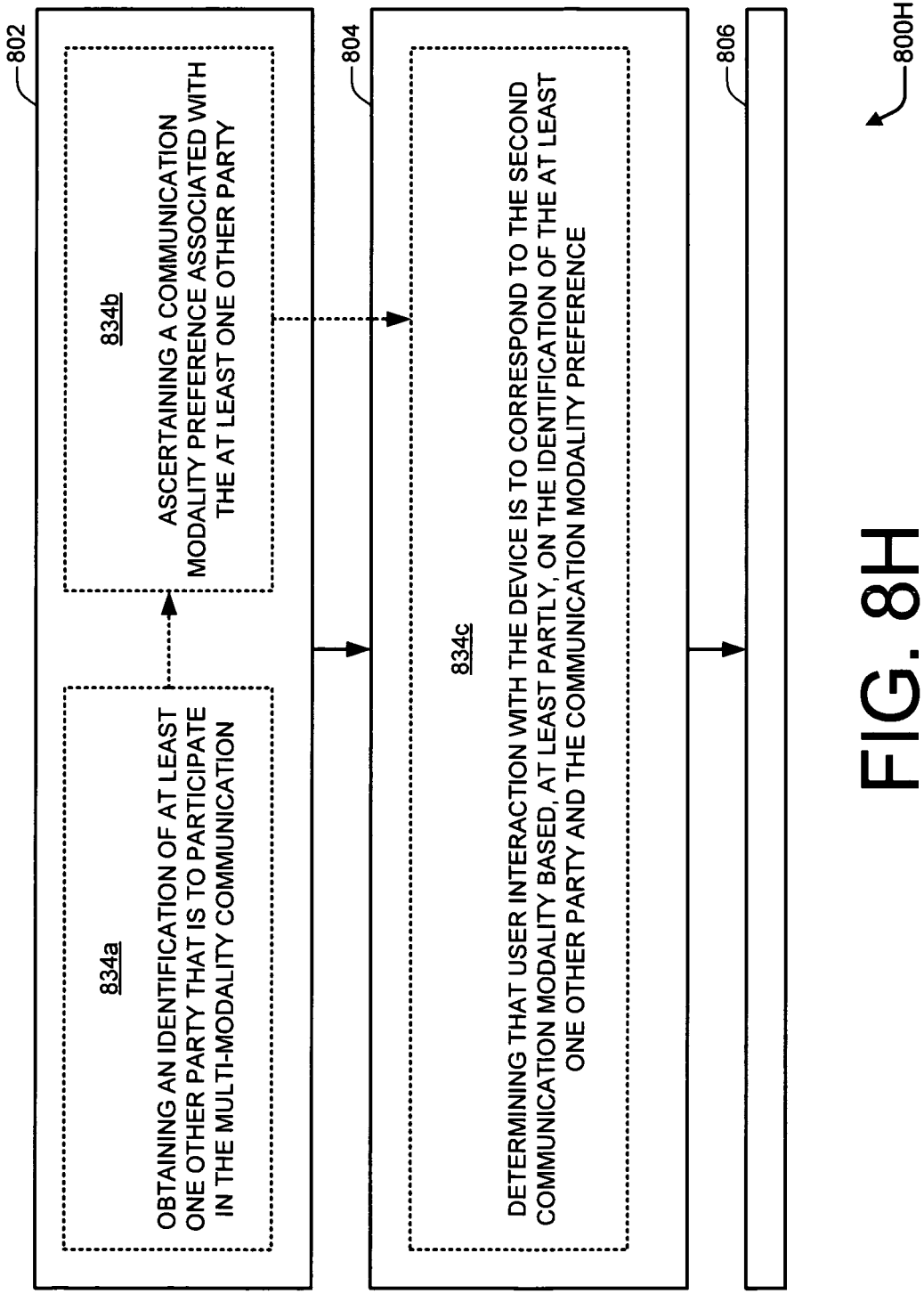

FIG. 8H illustrates a flow diagram 800H having example operations 834*a*, 834*b*, or 834*c*. For certain example embodiments, an operation 834 (e.g., an operation 834*a*, 834*b*, or 834*c*) may be directed at least partially to wherein: the obtaining one or more parameters relating to utilization of the device (of operation 802) comprises obtaining an identification of at least one other party that is to participate in the multi-modality communication (for operation 834*a*) and ascertaining a communication modality preference associated with the at least one other party (for operation 834*b*); and the determining that user interaction with the device is to correspond to a second communication modality based, at least partly, on the one or more parameters relating to utilization of the device (of operation 804) comprises determining that user interaction with the device is to correspond to the second communication modality based, at least partly, on the identification of the at least one other party and the communication modality preference (for operation 834*c*). By way of example but not limitation, a second communication device 102-2 may obtain an identification of at least one other party that is to participate in a multi-modality communication 712*b* (e.g., in addition to a second user 104-2 of second communication device 102-2) or ascertain a communication modality preference that is associated with the at least one other party based at least partially on a party and preferred communication modality association 770. For certain example implementations, an identification of another party to a communication may obtained by an inspection of an outgoing communication initiation message (e.g., by extracting at least one destination identifier), may be obtained by inspecting an incoming communication initiation message (e.g., by extracting caller identification data), may be obtained in response to a request, may be obtained via a notification, any combination thereof, and so forth. For certain example implementations, a party and preferred communication modality association 770 may include at least one entry that associates (e.g., links) a person (e.g., individually or as a member of a group) to a preferred communication modality. A party and preferred communication modality association 770 may be realized, by way of example only, as a table linking individuals or groups (e.g., by name, by physical or email address, by virtual handle, by phone number, a combination thereof, etc.) to a respective one or more preferred communication modalities. Additionally or alternatively, a party and preferred communication modality association 770 may be realized as a respective block of a respective contact entry for an individual or a group. A party and preferred communication modality association 770 may be stored locally on second communication device 102-2 or remotely. By way of example but not limitation, a second communication device 102-2 may further determine that user interaction is to correspond to a second communication modality 106-2 based, at least partly, on the identification of the at least one other party and the communication modality preference ascertained from a party and preferred communication modality association 770. For certain example implementations, a user may prefer that incoming voice communications from a parent be converted to a textual mode of interaction, may prefer that a textual communication from a significant other be converted to a video communication modality, may prefer that an incoming video communication from anyone that is part of a particular company (e.g., a place of employment) be converted to voice interaction, a combination thereof, and so forth. However, claimed subject matter is not limited to any particular described embodiments, implementations, examples, etc.

Figure 8I:
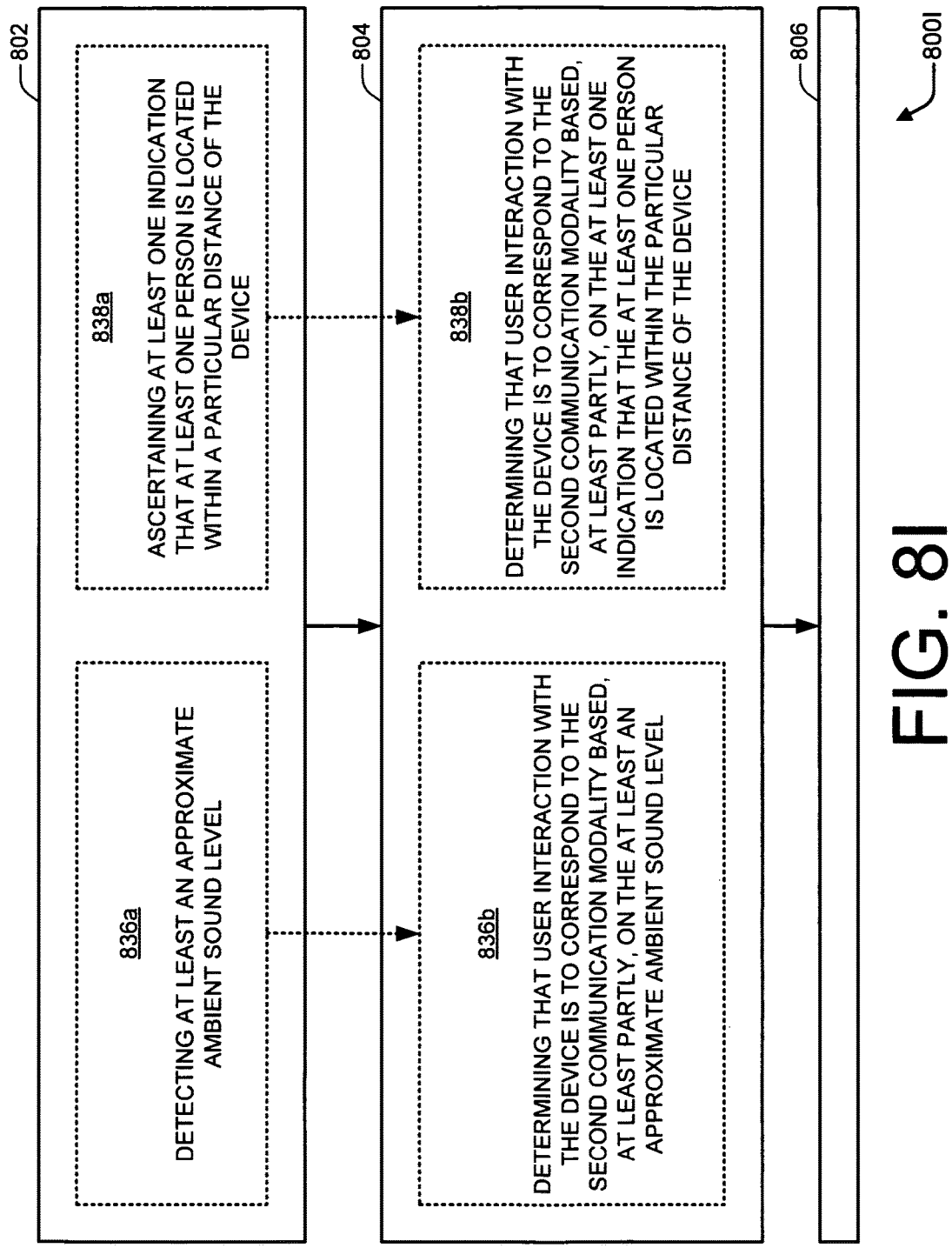

FIG. 8I illustrates a flow diagram 800I having example operations 836*a*, 836*b*, 838*a*, or 838*b*. For certain example embodiments, an operation 836 (e.g., an operation 836*a* or 836*b*) may be directed at least partially to wherein: the obtaining one or more parameters relating to utilization of the device (of operation 802) comprises detecting at least an approximate ambient sound level (for operation 836*a*); and the determining that user interaction with the device is to correspond to a second communication modality based, at least partly, on the one or more parameters relating to utilization of the device (of operation 804) comprises determining that user interaction with the device is to correspond to the second communication modality based, at least partly, on the at least an approximate ambient sound level (for an operation 836*b*). By way of example but not limitation, a second communication device 102-2 may detect at least an approximate ambient sound level or determine that user interaction with the device is to correspond to a second communication modality 106-2 based, at least partly, on the at least an approximate ambient sound level. For certain example implementations, a second communication device 102-2 may detect at least one ambient sound level 772 (e.g., via one or more sensors 752, such as at least one microphone) and compare ambient sound level 772 to at least one ambient sound threshold 774, which may be previously measured or indicated locally at second communication device 102-2 or may be received from an external source (e.g., from a network communication device 110). If, for instance, an ambient sound level 772 exceeds an upper ambient sound threshold 774, then a user may wish to communicate via text, including for an incoming voice communication, because the user's surroundings are too noisy. If, on the other hand, an ambient sound level 772 is below a lower ambient sound threshold 774, then a user may wish to communicate via text, including for an incoming voice communication, because the user is likely located in an environment that expects quiet (e.g., a library, a "quiet car" of a commuter train, etc.). One or more ambient sound thresholds 774 may be user-selectable or otherwise settable by a user. However, claimed subject matter is not limited to any particular described embodiments, implementations, examples, etc.

For certain example embodiments, an operation 838 (e.g., an operation 838*a* or 838*b*) may be directed at least partially to wherein: the obtaining one or more parameters relating to utilization of the device (of operation 802) comprises ascertaining at least one indication that at least one person is located within a particular distance of the device (for operation 838*a*) and the determining that user interaction with the device is to correspond to a second communication modality based, at least partly, on the one or more parameters relating to utilization of the device (of operation 804) comprises determining that user interaction with the device is to correspond to the second communication modality based, at least partly, on the at least one indication that the at least one person is located within the particular distance of the device (for operation 838*b*). By way of example but not limitation, a second communication device 102-2 may ascertain at least one indication that at least one person is located within a particular distance (e.g., a distance threshold 776) of the device or determine that user interaction is to correspond to a second communication modality 106-2 based, at least partly, on the at least one indication that the at least one person is located within the particular distance of the device. For certain example implementations, a communication device 102 may ascertain at least one indication that at least one person is located within a particular distance of the communication device 102 based at least partly on "absolute" location data (e.g., SPS coordinates of a device associated with a person, location data from a location-aware web service, a combination thereof, etc.), "relative" location data (e.g., detection of proximity of a person by at least one device sensor, detection of proximity of a device associated with a person by at least one device sensor, a combination thereof, etc.), any combination thereof, and so forth. For certain example implementations, a communication device 102 may be configured to switch to a particular communication modality 106 if a given person is determined to be within a distance threshold 776 of the communication device 102. However, claimed subject matter is not limited to any particular described embodiments, implementations, examples, etc.

Figure 8J:
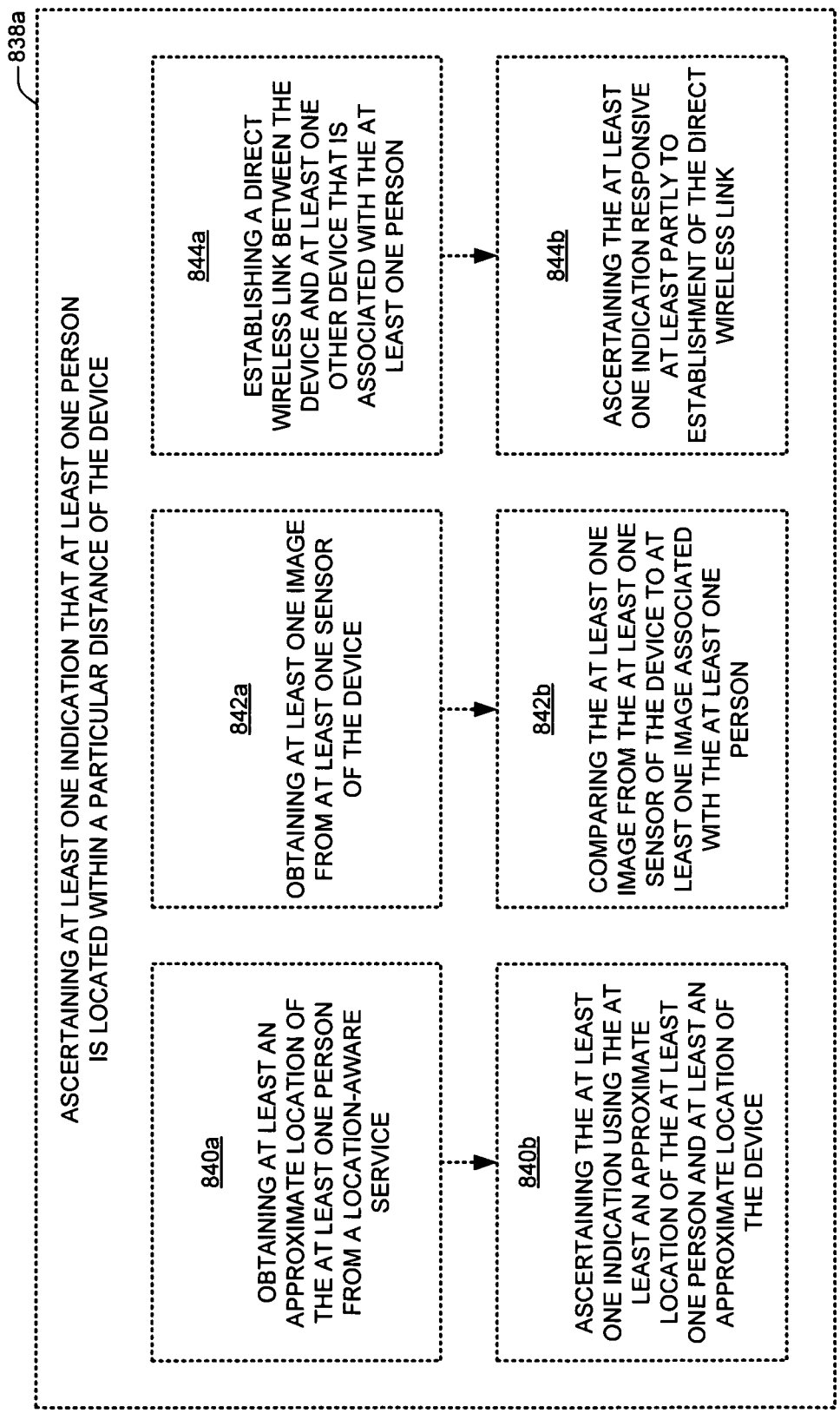

FIG. 8J illustrates a flow diagram 800J having example operations 840*a*, 840*b*, 842*a*, 842*b*, 844*a*, or 844*b*. For certain example embodiments, an operation 840 (e.g., an operation 840*a* or 840*b*) may be directed at least partially to wherein the ascertaining at least one indication that at least one person is located within a particular distance of the device (of operation 838*a*) comprises: obtaining at least an approximate location of the at least one person from a location-aware service (for operation 840*a*) and ascertaining the at least one indication using the at least an approximate location of the at least one person and at least an approximate location of the device (for operation 840*b*). By way of example but not limitation, at least an approximate location (e.g., a location or location range to a technically-feasible accuracy, a location or a location range to a legally-permissible accuracy, a location or location range to a user-permitted level of accuracy, a combination thereof, etc.) of at least one person may be obtained from at least one location-aware service. A location-aware service may include, by way of example only, a service that is provided from or by a network communication device 110, service that is provided from or by an internet company, a service that pushes location updates to a communication device 102, a service that enables a communication device to pull (e.g., request or retrieve) location updates, a service that a user 104 of a communication device may register for, a service that persons whose locations are being tracked or updated (e.g., by checking in at a location, by being associated with a device that is being tracked, a combination thereof, etc.) may register for, any combination thereof, and so forth. A communication device 102 may use a location aware indicator 778, which may comprise an indication of an "absolute" location of a person, an indication of a "relative" proximity of a person to communication device 102, an indication that a communication device 102 is logged into a location-aware service, an indication that a person's location is being updated by a location-aware service, any combination thereof, and so forth. By way of example but not limitation, at least one indication may be ascertained by a communication device 102 using an approximate location of at least one person and at least an approximate location of a communication device 102 in conjunction with at least one distance threshold 776 (e.g., if a difference between a location of a person and a location of a communication device 102 is less than a distance threshold 776). However, claimed subject matter is not limited to any particular described embodiments, implementations, examples, etc.

For certain example embodiments, an operation 842 (e.g., an operation 842*a* or 842*b*) may be directed at least partially to wherein the ascertaining at least one indication that at least one person is located within a particular distance of the device (of operation 838*a*) comprises: obtaining at least one image from at least one sensor of the device (for operation 842*a*) and comparing the at least one image from the at least one sensor of the device to at least one image associated with the at least one person (for operation 842b). By way of example but not limitation, an image from at least one sensor (e.g., a sensor 752 such as a camera) may be obtained or the at least one obtained image may be compared to an image associated with at least one person (e.g., a person image sample 780). For certain example implementations, a person image sample 780 of a person that is associated with the person by a communication device 102 (e.g., that is associated via a table of person image samples, associated via inclusion with or linking to a contact entry of a person, a combination thereof, etc.) may be compared to one or more images obtained by a camera sensor of a communication device 102. If a particular person (e.g., a boss, a spouse, a child, etc.) is determined to be within optical range of a communication device, an associated second communication modality 106-2 may be automatically activated for a communication 712a to transform it into a multi-modality communication 712b. However, claimed subject matter is not limited to any particular described embodiments, implementations, examples, etc.

For certain example embodiments, an operation 844 (e.g., an operation 844a or 844b) may be directed at least partially to wherein the ascertaining at least one indication that at least one person is located within a particular distance of the device (of operation 838a) comprises: establishing a direct wireless link between the device and at least one other device that is associated with the at least one person (for operation 844a) and ascertaining the at least one indication responsive at least partly to establishment of the direct wireless link (for operation 844b). By way of example but not limitation, a second communication device 102-2 may establish a direct wireless link between second communication device 102-2 and at least one other device that is associated with at least one person and may ascertain the at least one indication responsive at least partly to establishment of the direct wireless link. For certain example implementations, establishment by a second communication device 102-2 of a direct wireless link (e.g., a link with no intervening nodes) of a particular type (e.g., a short-range wireless link such as Bluetooth®, Wi-Fi, a combination thereof, etc.) with a first communication device 102-1 may comprise at least one indication that first communication device 102-1, as well as a first user 104-1 associated therewith, is located within a particular distance of second communication device 102-2. For instance, if a second communication device associated with a second user has established a direct wireless link with a third communication device associated with a third person and an incoming textual communication is received from an identified first person associated with a first communication device, the incoming communication may be transformed into a multi-modality communication in which the second user interacts with the second communication device via a voice interaction to avoid a textual representation of the communication with the first person being presented on a screen of the second communication device possibly in view of the third person. However, claimed subject matter is not limited to any particular described embodiments, implementations, examples, etc.

It should be appreciated that the particular embodiments (e.g., processes, apparatuses, systems, media, arrangements, etc.) described herein are merely possible implementations of the present disclosure, and that the present disclosure is not limited to the particular implementations described herein or shown in the accompanying figures.

In addition, in alternative implementations, certain acts, operations, etc. need not be performed in the order described, and they may be modified and/or may be omitted entirely, depending on the circumstances. Moreover, in various implementations, the acts or operations described may be implemented by a computer, controller, processor, programmable device, or any other suitable device, and may be based on instructions stored on one or more computer-readable or processor-accessible media or otherwise stored or programmed into such devices. If computer-readable media are used, the computer-readable media may be, by way of example but not limitation, any available media that can be accessed by a device to implement the instructions stored thereon.

Various methods, systems, techniques, etc. have been described herein in the general context of processor-executable instructions, such as program modules, executed by one or more processors or other devices. Generally, program modules may include routines, programs, objects, components, data structures, combinations thereof, etc. that perform particular tasks or implement particular abstract data types. Typically, functionality of program modules may be combined or distributed as desired in various alternative embodiments. In addition, embodiments of methods, systems, techniques, etc. may be stored on or transmitted across some form of device-accessible media.

It may also be appreciated that there may be little distinction between hardware implementations and software implementations for aspects of systems, methods, etc. that are disclosed herein. Use of hardware or software may generally be a design choice representing cost vs. efficiency tradeoffs, for example. However, in certain contexts, a choice between hardware and software (e.g., for an entirety or a given portion of an implementation) may become significant. Those having skill in the art will appreciate that there are various vehicles by which processes, systems, technologies, etc. described herein may be effected (e.g., hardware, software, firmware, combinations thereof, etc.), and that a preferred vehicle may vary depending upon a context in which the processes, systems, technologies, etc. are deployed. For example, if an implementer determines that speed and accuracy are paramount, an implementer may opt for a mainly hardware and/or firmware vehicle. Alternatively, if flexibility is deemed paramount, an implementer may opt for a mainly software implementation. In still other implementations, an implementer may opt for some combination of hardware, software, and/or firmware. Hence, there are multiple possible vehicles by which processes and/or devices and/or other technologies described herein may be effected. Which vehicle may be desired over another may be a choice dependent upon a context in which a vehicle is to be deployed or specific concerns (e.g., speed, flexibility, predictability, etc.) of an implementer, any of which may vary. Those skilled in the art will recognize that optical aspects of example implementations may employ optically-oriented hardware, software, and/or firmware.

Those skilled in the art will recognize that it is common within the art to describe devices and/or processes in fashion(s) as set forth herein, and thereafter use standard engineering practices to realize such described devices and/or processes into workable systems having described functionality. That is, at least a portion of the devices and/or processes described herein may be realized via a reasonable amount of experimentation.

Aspects and drawings described herein illustrate different components contained within, or connected with, other different components. It is to be understood that such depicted architectures are presented merely by way of example, and that many other architectures may be implemented to achieve identical or similar functionality. In a conceptual sense, any arrangement of components to achieve described functionality may be considered effectively "associated" such that desired functionality is achieved. Hence, any two or more components herein combined to achieve a particular functionality may be seen as "associated with" each other such that desired functionality is achieved, irrespective of architectures or intermedial components. Likewise, any two or more components so associated can also be viewed as being "operably connected" or "operably coupled" (or "operatively connected," or "operatively coupled") to each other to achieve desired functionality, and any two components capable of being so associated can also be viewed as being "operably couplable" (or "operatively couplable") to each other to achieve desired functionality. Specific examples of operably couplable include, but are not limited to, physically mateable and/or physically interacting components and/or wirelessly interactable and/or wirelessly interacting components and/or logically interacting and/or logically interactable components.

Those skilled in the art will recognize that at least some aspects of embodiments disclosed herein may be implemented at least partially via integrated circuits (ICs), as one or more computer programs running on one or more computing devices, as one or more software programs running on one or more processors, as firmware, as any combination thereof, and so forth. It will be further understood that designing circuitry and/or writing code for software and/or firmware may be accomplished by a person skilled in the art in light of the teachings and explanations of this disclosure.

The foregoing detailed description has set forth various example embodiments of devices and/or processes via the use of block diagrams, flowcharts, examples, combinations thereof, etc. Insofar as such block diagrams, flowcharts, examples, combinations thereof, etc. may contain or represent one or more functions and/or operations, it will be understood by those within the art that each function and/or operation within such block diagrams, flowcharts, examples, combination thereof, etc. may be implemented, individually and/or collectively, by a wide range of hardware, software, firmware, any combination thereof, and so forth. For example, in some embodiments, one or more portions of subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of example embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, as virtually any combination thereof, etc. and that designing circuitry and/or writing code for software and/or firmware is within the skill of one of skill in the art in light of the teachings of this disclosure.

In addition, those skilled in the art will appreciate that the mechanisms of subject matter described herein are capable of being distributed as a program product in a variety of forms, and that an illustrative embodiment of subject matter described herein applies regardless of a particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Although particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that inventive subject matter is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two item," without other modifiers, typically means at least two recitations, or two or more recitations).

As a further example of "open" terms in the present specification including the claims, it will be understood that usage of a language construction of "A or B" is generally interpreted, unless context dictates otherwise, as a non-exclusive "open term" meaning: A alone, B alone, and/or A and B together. Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Although various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for automatic activation of multi-modality communication, the method at least partially implemented by a communication device, the method comprising:
   (a) receiving one or more signals at the communication device associated with a communication from a remote communication device corresponding to a first communication modality;
   (b) obtaining two or more parameters relating to utilization of the communication device, wherein the two or more parameters include at least a first parameter that is indicative of whether the communication device is being transported within a moving vehicle and a second parameter that is indicative of an identity of a remote user associated with the remote communication device;
   (c) determining that user interaction with the communication device regarding the communication is to correspond to a selected communication modality based, at least partly, on at least one parameter of the two or more parameters relating to utilization of the communication device, the determining including at least:
      (1) determining, if the first parameter indicates that the communication device is being transported within the moving vehicle and the second parameter indicates that the remote party is not one of one or more designated individuals, that user interaction with the communication device regarding the communication is to correspond at least partly to a second communication modality, as the selected communication modality; and
      (2) determining, if the first parameter indicates that the communication device is being transported within the moving vehicle and the second parameter indicates that the remote party is one of the one or more designated individuals, that user interaction with the communication device regarding the communication is to correspond at least partly to a third communication modality, as the selected communication modality.

2. The method of claim 1, wherein the obtaining two or more parameters relating to utilization of the communication device comprises:
   detecting one or more environmental parameters using one or more sensors of the communication device.

3. The method of claim 1, wherein the determining that user interaction with the communication device regarding the communication is to correspond to a selected communication modality based, at least partly, on at least one parameter of the two or more parameters relating to utilization of the communication device comprises:
   processing at least one matrix of multiple parameters relating to utilization of the communication device in conjunction with multiple respective thresholds to determine that the communication device accepts one or more interactions with the local user via the selected communication modality.

4. The method of claim 1, wherein:
   obtaining two or more parameters relating to utilization of the communication device comprises:
   identifying at least one schedule entry of a calendar associated with the communication device; and
   ascertaining a current time; and
   determining that user interaction with the communication device regarding the communication is to correspond to a selected communication modality based, at least partly, on at least one parameter of the two or more parameters relating to utilization of the communication device comprises:
   determining that the current time matches a scheduled time corresponding to the at least one schedule entry of the calendar associated with the communication device.

5. The method of claim 1, wherein:
   obtaining two or more parameters relating to utilization of the communication device comprises:
   ascertaining that the communication device is connected to a vehicle via a wireless coupling; and
   determining that user interaction with the communication device regarding the communication is to correspond to a selected communication modality based, at least partly, on at least one parameter of the two or more parameters relating to utilization of the communication device comprises:
   determining that user interaction with the communication device is to correspond to the selected communication modality, the selected communication modality comprising a communication modality that may be implemented at least partially by the vehicle via the wireless coupling.

6. The method of claim 1, wherein:
   obtaining two or more parameters relating to utilization of the communication device comprises:
   obtaining at least an approximate location of the communication device; and
   determining that user interaction with the communication device regarding the communication is to correspond to a selected communication modality based, at least partly, on at least one parameter of the two or more parameters relating to utilization of the communication device comprises:
   determining that user interaction with the communication device is to correspond to the selected communication modality based, at least partly, on the at least an approximate location of the communication device.

7. The method of claim 1, wherein:
   obtaining two or more parameters relating to utilization of the communication device comprises:
   detecting at least an approximate ambient sound level; and
   determining that user interaction with the communication device regarding the communication is to correspond to a selected communication modality based, at least partly, on at least one parameter of the two or more parameters relating to utilization of the communication device comprises:
   determining that user interaction with the communication device is to correspond to the selected communication modality based, at least partly, on the at least an approximate ambient sound level.

8. The method of claim 1, wherein the determining that user interaction with the communication device regarding the communication is to correspond to a selected communication modality based, at least partly, on at least one parameter of the two or more parameters relating to utilization of the communication device comprises:

determining that user interaction with the communication device regarding the communication is to correspond to a selected communication modality based at least partially on whether the communication is at least one of initiated at the communication device or terminated at the communication device.

9. The method of claim 1, wherein the first communication modality corresponds to a voice user interaction modality; and
wherein the determining, if the first parameter indicates that the communication device is being transported within the moving vehicle and the second parameter indicates that the remote party is not one of one or more designated individuals, that user interaction with the communication device regarding the communication is to correspond at least partly to a second communication modality, as the selected communication modality, comprises:
determining that user interaction with the communication device regarding the communication is to correspond at least partly to a textual user interaction modality based, at least partly, on the first parameter indicating that the communication device is being transported within the moving vehicle and the second parameter indicating that the remote party is not one of one or more designated individuals.

10. The method of claim 1, wherein the first communication modality corresponds to a voice user interaction modality; and
wherein the determining, if the first parameter indicates that the communication device is being transported within the moving vehicle and the second parameter indicates that the remote party is one of the one or more designated individuals, that user interaction with the communication device regarding the communication is to correspond at least partly to a third communication modality, as the selected communication modality comprises:
determining that user interaction with the communication device regarding the communication is to correspond at least partly to a video user interaction modality based, at least partly, on the first parameter indicating that the communication device is being transported within the moving vehicle and the second parameter indicating that the remote party is one of the one or more designated individuals.

11. The method of claim 1, wherein:
obtaining two or more parameters relating to utilization of the communication device comprises:
detecting one or more movement patterns of the communication device using one or more sensors of the communication device; and
ascertaining at least one movement pattern sample corresponding to transport movement within a vehicle; and
determining that user interaction with the communication device regarding the communication is to correspond to a selected communication modality based, at least partly, on at least one parameter of the two or more parameters relating to utilization of the communication device comprises:
determining at least one correlation between the detected one or more movement patterns of the communication device and the ascertained at least one movement pattern sample corresponding to transport movement within a vehicle.

12. The method of claim 11, wherein the determining at least one correlation between the detected one or more movement patterns of the communication device and the ascertained at least one movement pattern sample corresponding to transport movement within a vehicle comprises:
determining that user interaction with the communication device is to correspond to the selected communication modality based at least partially on the at least one correlation between the detected one or more movement patterns of the communication device and the ascertained at least one movement pattern sample corresponding to transport movement within a vehicle.

13. The method of claim 1, wherein:
obtaining two or more parameters relating to utilization of the communication device comprises:
ascertaining an application that is currently being executed by the communication device and interacted with by the local user of the communication device via at least a user input interface of the communication device; and
determining that user interaction with the communication device regarding the communication is to correspond to a selected communication modality based, at least partly, on at least one parameter of the two or more parameters relating to utilization of the communication device comprises:
responsive at least in part to the ascertaining, determining that user interaction with the communication device is to correspond to the selected communication modality based at least partly on an association between the selected communication modality and the application.

14. The method of claim 13, wherein the application includes at least a game, the first communication modality includes at least one of a textual user interaction modality or a video user interaction modality, and the selected communication modality includes at least a voice user interaction modality.

15. The method of claim 1, wherein:
obtaining two or more parameters relating to utilization of the communication device comprises:
obtaining an identification of at least one other party that is to participate in the multi-modality communication; and
determining that user interaction with the communication device regarding the communication is to correspond to a selected communication modality based, at least partly, on at least one parameter of the two or more parameters relating to utilization of the communication device comprises:
determining that user interaction with the communication device is to correspond to the selected communication modality based, at least partly, on the identification of the at least one other party.

16. The method of claim 15, wherein the determining that user interaction with the communication device is to correspond to the selected communication modality based, at least partly, on the identification of the at least one other party comprises:
determining that user interaction with the communication device is to correspond to the selected communication modality based, at least partly, on at least one communication modality preference of an identified user of the remote communication device.

17. The method of claim 1, wherein:
obtaining two or more parameters relating to utilization of the communication device comprises:
ascertaining at least one indication that at least one person is located within a particular distance of the communication device; and determining that user interaction with the communication device regarding the communication is to correspond to a selected communication modality based, at least partly, on at least one parameter of the two or more parameters relating to utilization of the communication device comprises:
  determining that user interaction with the communication device is to correspond to the selected communication modality based, at least partly, on the at least one indication that the at least one person is located within the particular distance of the communication device.

18. The method of claim 17, wherein the ascertaining at least one indication that at least one person is located within a particular distance of the communication device comprises:
  obtaining at least an approximate location of the at least one person from a location-aware service; and
  ascertaining the at least one indication using the at least an approximate location of the at least one person and at least an approximate location of the communication device.

19. The method of claim 17, wherein the ascertaining at least one indication that at least one person is located within a particular distance of the communication device comprises:
  obtaining at least one image from at least one sensor of the communication device; and
  comparing the at least one image from the at least one sensor of the communication device to at least one image associated with the at least one person.

20. The method of claim 17, wherein the ascertaining at least one indication that at least one person is located within a particular distance of the communication device comprises:
  establishing a direct wireless link between the communication device and at least one other device that is associated with the at least one person; and
  ascertaining the at least one indication responsive at least partly to establishment of the direct wireless link.

21. The method of claim 17, wherein the determining that user interaction with the communication device is to correspond to the selected communication modality based, at least partly, on the at least one indication that the at least one person is located within the particular distance of the communication device comprises:
  determining that user interaction with the communication device is to correspond to the selected communication modality based at least partially on at least one indication that at least one person, other than the local user, is located within a particular distance of the communication device.

22. The method of claim 1, wherein the selected communication modality is at least one of the second or the third communication modality and further comprising:
  activating at least one feature that causes the communication corresponding to a first communication modality to include at least a multi-modality communication corresponding to the first communication modality and to at least one of the second communication modality or the third communication modality responsive at least partly to the determining that user interaction with the communication device regarding the communication is to correspond to a selected communication modality.

23. The method of claim 22, wherein activating at least one feature that causes the communication corresponding to a first communication modality to include at least a multi-modality communication corresponding to the first communication modality and to at least one of the second communication modality or the third communication modality responsive at least partly to the determining that user interaction with the communication device regarding the communication is to correspond to a selected communication modality comprises:
  establishing at least one user interaction intimacy setting corresponding to at least one of the second communication modality or the third communication modality.

24. The method of claim 22, wherein the activating at least one feature that causes the communication corresponding to a first communication modality to include at least a multi-modality communication corresponding to the first communication modality and to at least one of the second communication modality or the third communication modality responsive at least partly to the determining that user interaction with the communication device regarding the communication is to correspond to a selected communication modality comprises:
  engaging user interface functionality of the communication device that corresponds to the second communication modality responsive at least partly to the determining that user interaction with the communication device is to correspond to at least one of the second communication modality or the third communication modality.

25. The method of claim 24, wherein the first communication modality includes at least a textual user interaction modality; and wherein the engaging user interface functionality of the communication device that corresponds to the second communication modality responsive at least partly to the determining that user interaction with the communication device is to correspond to at least one of the second communication modality or the third communication modality comprises:
  engaging at least one of a microphone or a speaker of the communication device to enable at least one of the second communication modality or the third communication modality.

26. The method of claim 22, wherein the activating at least one feature that causes the communication corresponding to a first communication modality to include at least a multi-modality communication corresponding to the first communication modality and to at least one of the second communication modality or the third communication modality responsive at least partly to the determining that user interaction with the communication device regarding the communication is to correspond to a selected communication modality comprises:
  engaging conversion functionality of the communication device to cause at least one of (i) incoming data being converted from corresponding to the first communication modality to corresponding to at least one of the second communication modality or the third communication modality or (ii) outgoing data being converted from corresponding to at least one of the second communication modality or the third communication modality to corresponding to the first communication modality.

27. The method of claim 26, wherein the engaging conversion functionality of the communication device to cause at least one of (i) incoming data being converted from corresponding to the first communication modality to corresponding to at least one of the second communication modality or the third communication modality or (ii) outgoing data being converted from corresponding to at least one of the second communication modality or the third communication modality to corresponding to the first communication modality comprises:

engaging conversion functionality of the communication device (i) so that data corresponding to text is converted to data corresponding to voice or (ii) so that data corresponding to voice is converted to data corresponding to text.

28. The method of claim 22, wherein the activating at least one feature that causes the communication corresponding to a first communication modality to include at least a multi-modality communication corresponding to the first communication modality and to at least one of the second communication modality or the third communication modality responsive at least partly to the determining that user interaction with the communication device regarding the communication is to correspond to a selected communication modality comprises:

causing a conversion of data associated with the communication to occur at another device, the conversion of data including at least one of (i) a conversion from data that corresponds to the first communication modality to data that corresponds to at least one of the second communication modality or the third communication modality or (ii) a conversion from data that corresponds to at least one of the second communication modality or the third communication modality to data that corresponds to the first communication modality.

29. The method of claim 28, wherein the causing a conversion of data associated with the communication to occur at another device comprises:

causing a conversion of data associated with the communication to occur at the remote communication device.

30. The method of claim 28, wherein the causing a conversion of data associated with the communication to occur at another device comprises:

causing a conversion of data associated with the communication to occur at a network communication device.

31. A communication device for automatic activation of multi-modality communication, the communication device comprising:

(a) circuitry for receiving one or more signals at the communication device associated with a communication from a remote communication device corresponding to a first communication modality;

(b) circuitry for obtaining two or more parameters relating to utilization of the communication device, wherein the two or more parameters include at least a first parameter that is indicative of whether the communication device is being transported within a moving vehicle and a second parameter that is indicative of an identity of a remote user associated with the remote communication device;

(c) circuitry for determining that user interaction with the communication device regarding the communication is to correspond to a selected communication modality based, at least partly, on at least one parameter of the two or more parameters relating to utilization of the communication device, the determining including at least:

(1) circuitry for determining, if the first parameter indicates that the communication device is being transported within the moving vehicle and the second parameter indicates that the remote party is not one of one or more designated individuals, that user interaction with the communication device regarding the communication is to correspond at least partly to a second communication modality, as the selected communication modality; and (2) circuitry for determining, if the first parameter indicates that the communication device is being transported within the moving vehicle and the second parameter indicates that the remote party is one of the one or more designated individuals, that user interaction with the communication device regarding the communication is to correspond at least partly to a third communication modality, as the selected communication modality.

32. A computer program product, comprising:

at least one non-transitory computer readable medium including at least:

(a) one or more instructions for receiving one or more signals at the communication device associated with a communication from a remote communication device corresponding to a first communication modality;

(b) one or more instructions for obtaining two or more parameters relating to utilization of the communication device, wherein the two or more parameters include at least a first parameter that is indicative of whether the communication device is being transported within a moving vehicle and a second parameter that is indicative of an identity of a remote user associated with the remote communication device;

(c) one or more instructions for determining that user interaction with the communication device regarding the communication is to correspond to a selected communication modality based, at least partly, on at least one parameter of the two or more parameters relating to utilization of the communication device, the determining including at least:

(1) one or more instructions for determining, if the first parameter indicates that the communication device is being transported within the moving vehicle and the second parameter indicates that the remote party is not one of one or more designated individuals, that user interaction with the communication device regarding the communication is to correspond at least partly to a second communication modality, as the selected communication modality; and (2) one or more instructions for determining, if the first parameter indicates that the communication device is being transported within the moving vehicle and the second parameter indicates that the remote party is one of the one or more designated individuals, that user interaction with the communication device regarding the communication is to correspond at least partly to a third communication modality, as the selected communication modality.

* * * * *